US010250888B2

(12) United States Patent
Jeong et al.

(10) Patent No.: US 10,250,888 B2
(45) Date of Patent: Apr. 2, 2019

(54) ELECTRONIC DEVICE CONFIGURED TO NON-UNIFORMLY ENCODE/DECODE IMAGE DATA ACCORDING TO DISPLAY SHAPE

(71) Applicant: Samsung Electronics Co., Ltd., Suwon-si, Gyeonggi-do (KR)

(72) Inventors: Yowon Jeong, Anyang-si (KR); Taekkyun Shin, Gwangmyeong-si (KR); Yong-Won Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 211 days.

(21) Appl. No.: 15/281,777

(22) Filed: Sep. 30, 2016

(65) Prior Publication Data
US 2017/0105009 A1 Apr. 13, 2017

(30) Foreign Application Priority Data
Oct. 8, 2015 (KR) .................. 10-2015-0141758

(51) Int. Cl.
*G06K 9/36* (2006.01)
*G06K 9/46* (2006.01)
*H04N 19/167* (2014.01)
*H04N 19/136* (2014.01)
*H04N 19/176* (2014.01)
*H04N 5/232* (2006.01)
*H04N 19/119* (2014.01)
*H04N 19/172* (2014.01)
(Continued)

(52) U.S. Cl.
CPC ....... *H04N 19/167* (2014.11); *H04N 5/23293* (2013.01); *H04N 19/119* (2014.11); *H04N 19/136* (2014.11); *H04N 19/164* (2014.11); *H04N 19/172* (2014.11); *H04N 19/176* (2014.11); *G06K 9/00597* (2013.01)

(58) Field of Classification Search
None
See application file for complete search history.

(56) References Cited

U.S. PATENT DOCUMENTS 6,148,033 A * 11/2000 Pearlstein ............ H04N 19/105
375/240.16
7,899,259 B2 * 3/2011 Ishikawa ................ H04N 19/63
382/232
(Continued)

FOREIGN PATENT DOCUMENTS

JP 2007-274621 A 10/2007
JP 2009-071580 A 4/2009
KR 2012-0019662 A 3/2012

*Primary Examiner* — Feng Niu
(74) *Attorney, Agent, or Firm* — Harness, Dickey & Pierce, P.L.C.

(57) ABSTRACT

An electronic device includes an operation processor for encoding image data that is generated by capturing an object, and a communication circuit for communicating with an external device. The operation processor divides an image represented by the image data into a first region and a second region based on an information signal that is received from the external device, encode first image data corresponding to the first region by a first encoding manner, and encode second image data corresponding to the second region by a second encoding manner. An outline of the first region varies depending on a shape of a display device of the external device.

11 Claims, 18 Drawing Sheets

(51) Int. Cl.
*H04N 19/164* (2014.01)
*G06K 9/00* (2006.01)

(56) References Cited

U.S. PATENT DOCUMENTS

| | | | | |
|---|---|---|---|---|
| 8,019,175 | B2* | 9/2011 | Lee | H04N 7/147 348/14.01 |
| 8,345,983 | B2* | 1/2013 | Noguchi | H04N 19/132 382/190 |
| 8,768,084 | B2* | 7/2014 | Wang | H04N 19/147 375/240.24 |
| 8,849,846 | B1* | 9/2014 | Wang | G06F 17/30345 707/766 |
| 9,041,767 | B2* | 5/2015 | Leviav | H04N 7/152 345/535 |
| 9,055,185 | B2 | 6/2015 | Abuan et al. | |
| 9,204,090 | B2* | 12/2015 | Kim | H04N 7/147 |
| 9,618,970 | B2* | 4/2017 | Lee | H04N 5/2628 |
| 9,762,916 | B2* | 9/2017 | Mochizuki | H04N 19/176 |
| 9,826,078 | B2* | 11/2017 | Kim | G06F 3/0482 |
| 2006/0215753 | A1* | 9/2006 | Lee | H04N 7/147 375/240.08 |
| 2006/0215766 | A1* | 9/2006 | Wang | H04N 19/147 375/240.24 |
| 2007/0120954 | A1 | 5/2007 | Allen et al. | |
| 2010/0060783 | A1 | 3/2010 | Belt | |
| 2010/0119156 | A1* | 5/2010 | Noguchi | H04N 19/132 382/190 |
| 2012/0308147 | A1* | 12/2012 | Ikeda | H04N 19/132 382/233 |
| 2013/0003845 | A1 | 1/2013 | Zhou et al. | |
| 2013/0342640 | A1 | 12/2013 | Li et al. | |
| 2014/0002585 | A1* | 1/2014 | Leviav | H04N 7/152 348/14.08 |
| 2014/0022329 | A1* | 1/2014 | Kim | H04N 7/147 348/14.03 |
| 2014/0079126 | A1* | 3/2014 | Ye | H04N 19/105 375/240.16 |
| 2015/0063439 | A1* | 3/2015 | Mochizuki | H04N 19/176 375/240.02 |
| 2015/0181168 | A1* | 6/2015 | Pahalawatta | H04N 19/80 348/14.12 |
| 2016/0085266 | A1* | 3/2016 | Lee | H04N 5/2628 348/240.2 |
| 2016/0119464 | A1* | 4/2016 | Kim | G06F 3/0482 455/566 |
| 2018/0129394 | A1* | 5/2018 | Lee | G06F 3/0488 |

\* cited by examiner

| First Region | Encoded by first encoding manner |
|---|---|
| Second Region | Encoded by second encoding manner |
| Third Region | (a) Encoded by second encoding manner<br>(b) Encoded by third encoding manner<br>(c) Not encoded |

ELECTRONIC DEVICE CONFIGURED TO NON-UNIFORMLY ENCODE/DECODE IMAGE DATA ACCORDING TO DISPLAY SHAPE

CROSS-REFERENCE TO RELATE D APPLICATIONS

The present application claims priority under 35 U.S.C. § 119 to Korean Patent Application No. 10-2015-0141758, filed on Oct. 8, 2015 in Korean Intellectual Property Office, the entire contents of which are incorporated herein by reference.

TECHNICAL FIELD

The present disclosure relates to electronic devices, and more particularly, relates to configurations and operations of the electronic devices that are capable of processing (e.g., encoding or decoding) image data.

DESCRIPTION OF THE RELATED ART

Nowadays, various kinds of electronic devices are being used. Most of electronic devices include various circuits and devices. The electronic device performs its own functions and provides a service to a user according to the operations of circuits and devices included in the electronic device.

For example, some electronic devices may include a display device. The display device such as a liquid crystal display (LCD) device, a light emitting diode (LED) display device, an organic LED (OLED) display device, or the like, may include a display panel and a control circuit. The electronic device including the display device may display information generated according to operations of the electronic device on the display device. Under control of the control circuit, the display device displays information on the display panel, and thus provides image information to a user.

Most display devices are configured to have a display with a rectangular shape. Image data associated with an image displayed on the display device are processed (e.g., encoded, decoded, and/or converted) by an image processing circuit and/or device. Generally, image processing is performed assuming that the rectangular image is displayed on a rectangular display device.

For example, an electronic device such as a computer, a laptop computer, a tablet computer, a smart phone, and/or the like, may include a rectangular display device. On the other hand, a wearable electronic device, such as a smart watch, a smart ring, and/or the like, may include a non-rectangular display device. Furthermore, the display device included in the wearable electronic device may be implemented to be flexible to improve portability and functionality of the wearable electronic device.

SUMMARY

The present disclosure may provide configurations and operations of electronic devices that are capable of processing image data. An electronic device according to some example embodiments may process image data efficiently when a shape of an image represented by the image data is different from a shape of a display device.

According to an example embodiment, an electronic device includes an operation processor and a communication circuit. The operation processor may be configured to encode image data that is generated by capturing an object. The operation processor may be further configured to divide an image represented by the image data into a first region and a second region based on an information signal received from an external device, the external device including a display device, an outline of the first region varying depending on a shape of the display device, encode first image data corresponding to the first region by a first encoding manner, and encode second image data corresponding to the second region by a second encoding manner, the second encoding manner being different from the first encoding manner. The communication circuit may be configured to receive the information signal from the external device and provide the information signal to the operation processor.

According to an example embodiment, an electronic device includes a region determiner, a video encoder, and a communication circuit. The region determiner may be configured to divide an image represented by image data into a first region, that is a region inside a boundary, the second region being a region outside the boundary, the boundary determined based on a shape of a display device of an external device, a shape of the image represented by the image data being different from the shape of the display device of the external device. The video encoder may be configured to encode first image data corresponding to the first region by a first encoding manner, and encode second image data corresponding to the second region by a second encoding manner that is different from the first encoding manner. The communication circuit may be configured to output an image signal that includes at least the encoded first image data, to the external device.

According to an example embodiment, an electronic device includes a communication circuit, a video decoder, and a display device. The communication circuit may be configured to receive an image signal from an external device. The video decoder may be configured to decode image data included in the image signal. The display device may be configured to display an output image based on the decoded image data. A shape of the display device may be different from a shape of a fundamental image captured or processed by the external device. The image data and the output image may be determined based on the shape of the display device.

According to an example embodiment, an electronic device includes an image sensor configured to generate an image signal of an object, a memory having computer-readable instructions stored therein, and at least one processor configured to execute the computer-readable instructions to cause the electronic device to generate, by processing the image signal, an image represented by image data, divide the image represented by the image data into two or more regions including at least a first region and a second region, the first region being a region inside or overlapping with a boundary, the second region being a region outside the boundary and adjacent to the first region, the boundary determined based on a shape of a display of an external device, the image represented by the image data being a plurality of processing blocks, encode, on a processing block basis, first image data corresponding to the first region predominantly by a first encoding manner and second image data corresponding to the second region by a second encoding manner, the second encoding manner having lower resolution than the first encoding manner, and output an image signal to the external device, the image signal including at least the encoded first image data.

BRIEF DESCRIPTION OF THE DRAWINGS

The above and other objects, features, and advantages will become apparent from the following description with reference to the following figures, wherein like reference numerals refer to like parts throughout the various figures unless otherwise specified, and wherein.

DETAILED DESCRIPTION

Figure 1:
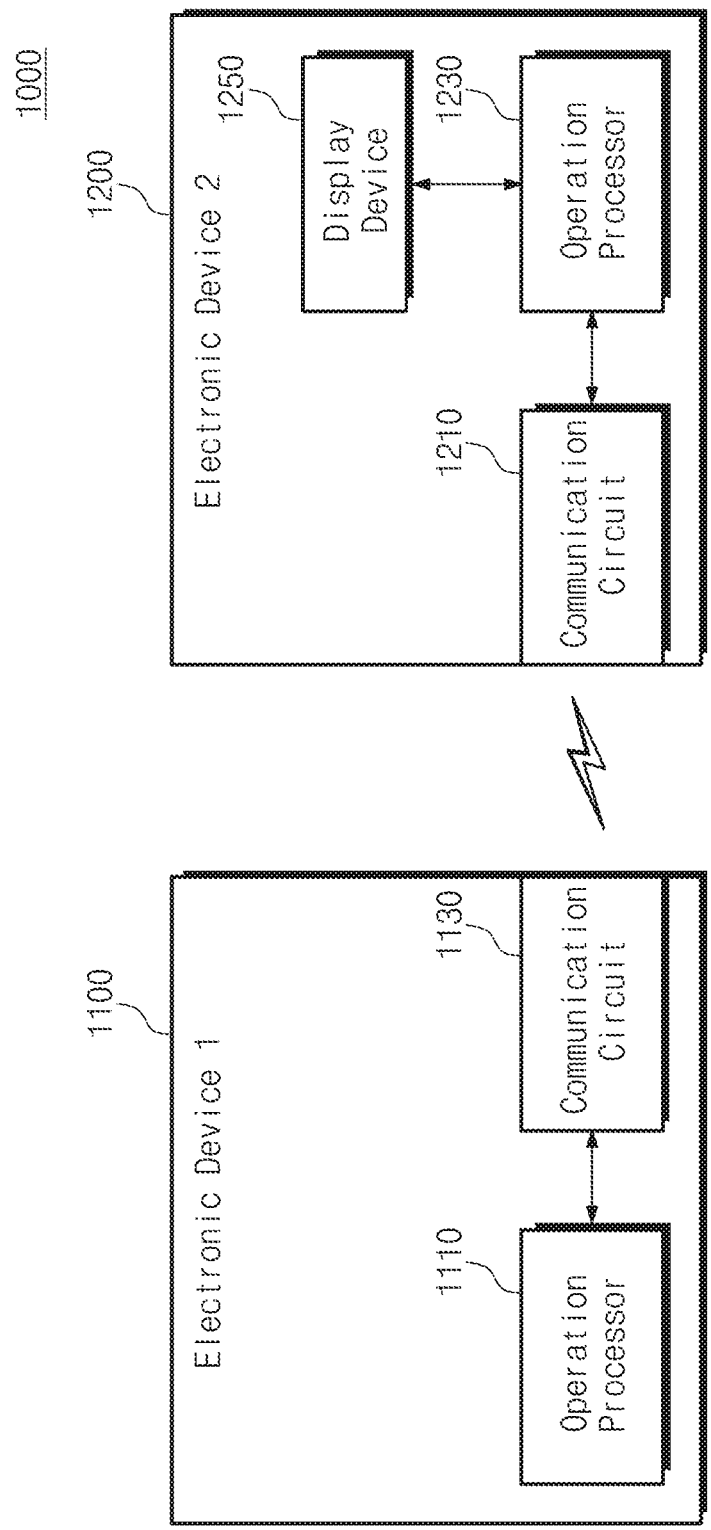
FIG. 1 is a block diagram illustrating an electronic system including electronic devices according to an example embodiment.

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are merely provided so that this disclosure will be thorough and complete, and will fully convey the scope of example embodiments to those skilled in the art. In the drawings, the sizes and relative sizes of the various layers and regions may have been exaggerated for clarity. Like numerals refer to like elements throughout.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of A, B, or C" and "A, B, and/or C" means either A, B, C or any combination thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram illustrating an electronic system including electronic devices according to an example embodiment. An electronic system 1000 may include a first electronic device 1100 and a second electronic device 1200.

In some example embodiments, the first electronic device 1100 may include an operation processor 1110 and a communication circuit 1130. The operation processor 1110 may process operations that are desired to operate the first electronic device 1110. For example, the operation processor 1110 may include, for example, at least one of a general-purpose processor, a special-purpose processor, or an application processor, but the present disclosure is not limited thereto.

In some example embodiments, the first electronic device 1100 may be an electronic device that is configured to process image data. For example, the first electronic device 1100 may be an electronic device that is capable of processing the image data, such as a digital camera, a video camcorder, a computer, a notebook, a smart phone, or the like. In such example embodiments, the operation processor 1110 may perform an "image processing" on the image data.

For example, the operation processor 1110 may encode the image data. The operation processor 1110 may include a video encoder (not shown) configured to encode the image data. The video encoder may be implemented using hardware components or a combination of hardware and software components. For example, the hardware components may include processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and/or one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. Further, different processing configurations are possible, such a parallel processors. The software components may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. However, in some example embodiments, the video encoder may be provided separately from the operation processor 1110. In some example embodiments, the first electronic device 1100 may further include a video decoder (not shown) configured to decode the image data. The video decoder may be included in the operation processor 1110 or may be provided separately from the operation processor 1110.

In some example embodiments, the video encoder and/or the video decoder may employ an encoding/decoding scheme that is based on at least one of high efficiency video coding (HEVC) specification or VP9 specification. However, the present disclosure is not limited thereto. For example, the video encoding/decoding scheme(s) may be based on other image processing specifications, for example, an advanced video coding (AVC) specification or a VP8 specification, may be employed. Example embodiments may be variously changed or modified.

The communication circuit 1130 may communicate with at least one external device. For example, the communication circuit 1130 may communicate with the second electronic device 1200. The first electronic device 1100 may recognize the second electronic device 1200 as an external device. In some example embodiments, the communication circuit 1130 may receive encoded image data from the operation processor 1110. The communication circuit 1130 may output an image signal including the encoded image data to the second electronic device 1200.

In some example embodiments, the second electronic device 1200 may include a communication circuit 1210, an operation processor 1230, and a display device 1250. The communication circuit 1210 may communicate with at least one external device. For example, the communication circuit 1210 may communicate with the first electronic device 1100. The second electronic device 1200 may recognize the first electronic device 1100 as an external device. In some example embodiments, the communication circuit 1210 may receive image data from the communication circuit 1130 of the first electronic device 1100.

The operation processor 1230 may process operations that are desired to operate the second electronic device 1200. For example, the operation processor 1230 may include at least one of a general-purposed processor, a special-purposed processor, or an application processor, but the present disclosure is not limited thereto.

The second electronic device 1200 may include the display device 1250. For example, the second electronic device 1200 may process image data and display an image on the display device 1250 (e.g., a smart watch or a smart glass). The operation processor 1230 may perform an "image processing" on the image data included in the image signal, which is received through the communication circuit 1210.

For example, the operation processor 1230 may decode image data. The operation processor 1230 may include a video decoder (not shown) configured to decode the image data. The video decoder may be implemented using hardware components or a combination of hardware and software components. However, in some example embodiments, the video decoder may be provided separately from the operation processor 1230. In some example embodiments, the second electronic device 1200 may further include a video encoder (not shown) configured to encode the image data. The video encoder may be included in the operation processor 1230 or may be provided separately from the operation processor 1230.

The display device 1250 may display an image to provide image information to a user. For example, the display device 1250 may display an image based on image data that is decoded by the operation processor 1230. In this example, the display device 1250 may display an output image based on the image data that is generated or processed by the first electronic device 1100. For example, the display device 1250 may include at least one of a liquid crystal display (LCD) device, a light emitting diode (LED) display device, an organic LED (OLED) display device, or an active matrix OLED (AMOLED) display device.

In the electronic system 1000, the communication circuits 1130 and 1210 may communicate with each other. The first electronic device 1100 may transmit image data to the second electronic device 1200 through the communication circuit 1130. The second electronic device 1200 may display an image on the display device 1250 based on the image data that is transmitted through the communication circuit 1210.

In some example embodiments, the communication circuits 1130 and 1210 may communicate with each other in compliance with at least one of various communication protocols. For example, the communication circuits 1130 and 1210 may employ at least one of wireless communication protocols (e.g., code division multiple access (CDMA), high speed packet access (HSPA), global system for mobile communications (GSM), long term evolution (LTE), worldwide interoperability for microwave access (WiMax), wireless fidelity (WiFi), Bluetooth, near field communication (NFC), or radio frequency identification (RFID)). However, the present disclosure is not limited thereto. In some example embodiments, the communication circuits 1130 and 1210 may communicate with each other in compliance with at least one of wired communication protocols (e.g., transfer control protocol/internet protocol (TCP/IP), small computer system interface (SCSI), advanced technology attachment (ATA), serial attached SCSI (SAS), universal serial bus (USB), or Firewire).

For example, when the first electronic device 1100 generates image data in real time, the second electronic device 1200 may display an image on the display 1250 in real time. Thus, the electronic system 1000 may be used as, for example, a video conferencing system or a monitoring system. For another example, when the first electronic device 1100 outputs an image signal including image data that is generated in advance, the electronic system 1000 may be used as a broadcasting system. The electronic system 1000 according to the example embodiment may be used in various ways. Some examples will be described in more detail with reference to FIGS. 2 and 3.

Above, one-way communication to transmit an image signal from the first electronic device 1100 to the second electronic device 1200 has been described. However, in some example embodiments, the first electronic device 1100 may further include some components of the second electronic device 1200, and the second electronic device 1200 may further include some components of the first electronic device 1100. Accordingly, the first electronic device 1100 and the second electronic device 1200 may be configured to exchange the image signal with each other by means of two-way communication.

Figure 2:
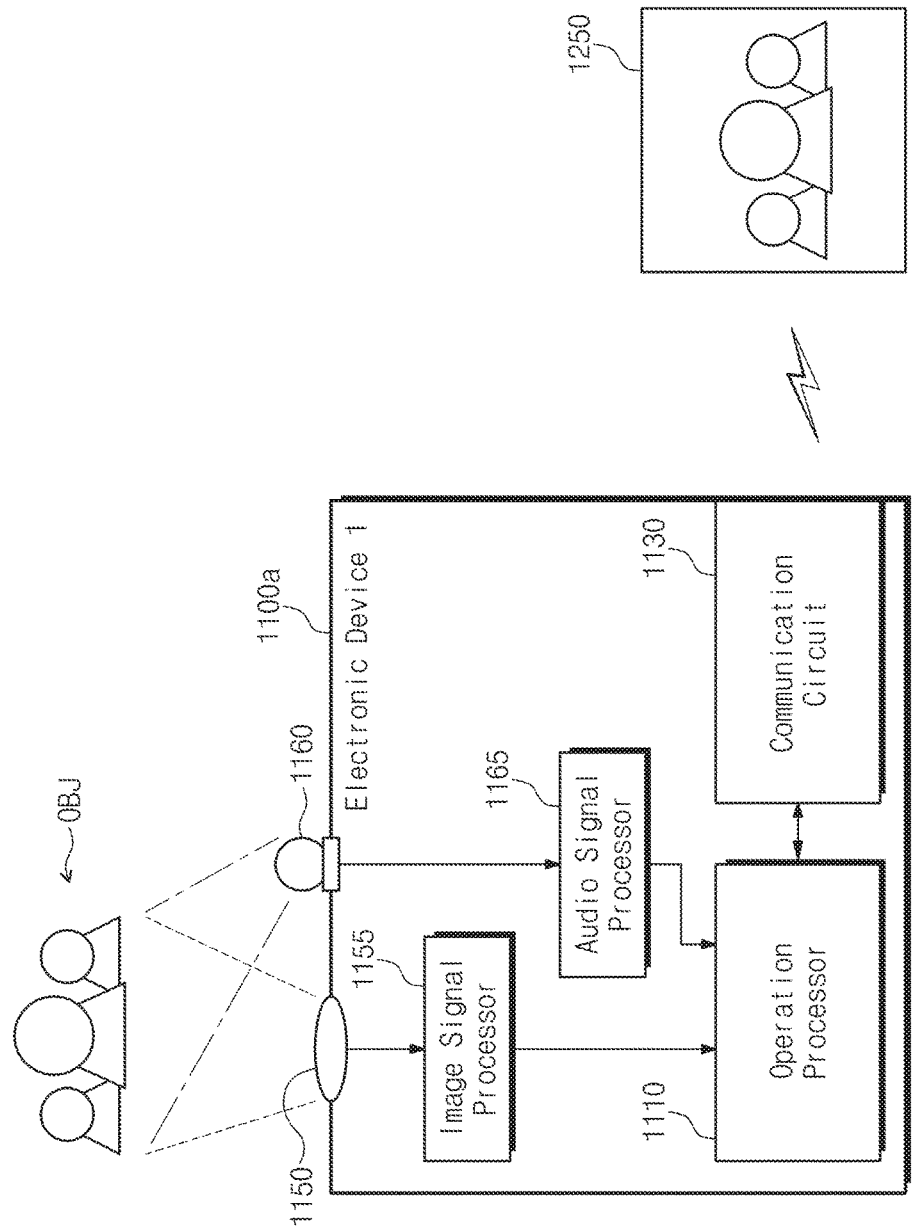
FIG. 2 is a schematic diagram illustrating an example implementation of a first electronic device of FIG. 1.

FIG. 2 is a schematic diagram illustrating an example implementation of a first electronic device of FIG. 1. For example, the first electronic device 1100 of FIG. 1 may include a first electronic device 1100a of FIG. 2.

In some example embodiments, the first electronic device 1100a may include an operation processor 1110, a communication circuit 1130, an image sensor 1150, and an image signal processor 1155. Configurations and operations of the operation processor 1110 and the communication circuit 1130 have been described with reference to FIG. 1, and thus redundant descriptions will be omitted below for brevity.

The image sensor 1150 may sense a light reflected from an object OBJ. The image sensor 1150 may generate an image signal, which includes information that is referred to display the object OBJ, based on the sensed light. The image signal processor 1155 may generate image data by processing the image signal generated by the image sensor 1150. The image signal processor 1155 may provide the image data to the operation processor 1110. As described above, the operation processor 1110 may encode the image data.

In some example embodiments, the first electronic device 1100a may be used to capture the object OBJ through the image sensor 1150 in real time. In this example embodiment, image data associated with the object OBJ may be output through the communication circuit 1130 in real time. The display device 1250 included in the second electronic device 1200 of FIG. 1 may display an image associated with the object OBJ in real time. When the first electronic device 1100a is employed, the electronic system 1000 of FIG. 1 may be used as, for example, a video conferencing system or a monitoring system.

In some example embodiments, the first electronic device 1100a may further include an audio sensor 1160 and an audio signal processor 1165. The audio sensor 1160 may sense a sound/voice generated by the object OBJ. The audio signal processor 1165 may generate audio data by processing the sound/voice sensed by the audio sensor 1160. The audio signal processor 1165 may provide the audio data to the operation processor 1110.

The operation processor 1110 may encode the audio data, and may provide the encoded audio data to the communication circuit 1130. The communication circuit 1130 may transmit an audio signal including the encoded audio data to the second electronic device 1200. The second electronic device 1200 may provide a user with information about the sound/voice generated by the object OBJ based on the audio signal.

Figure 3:
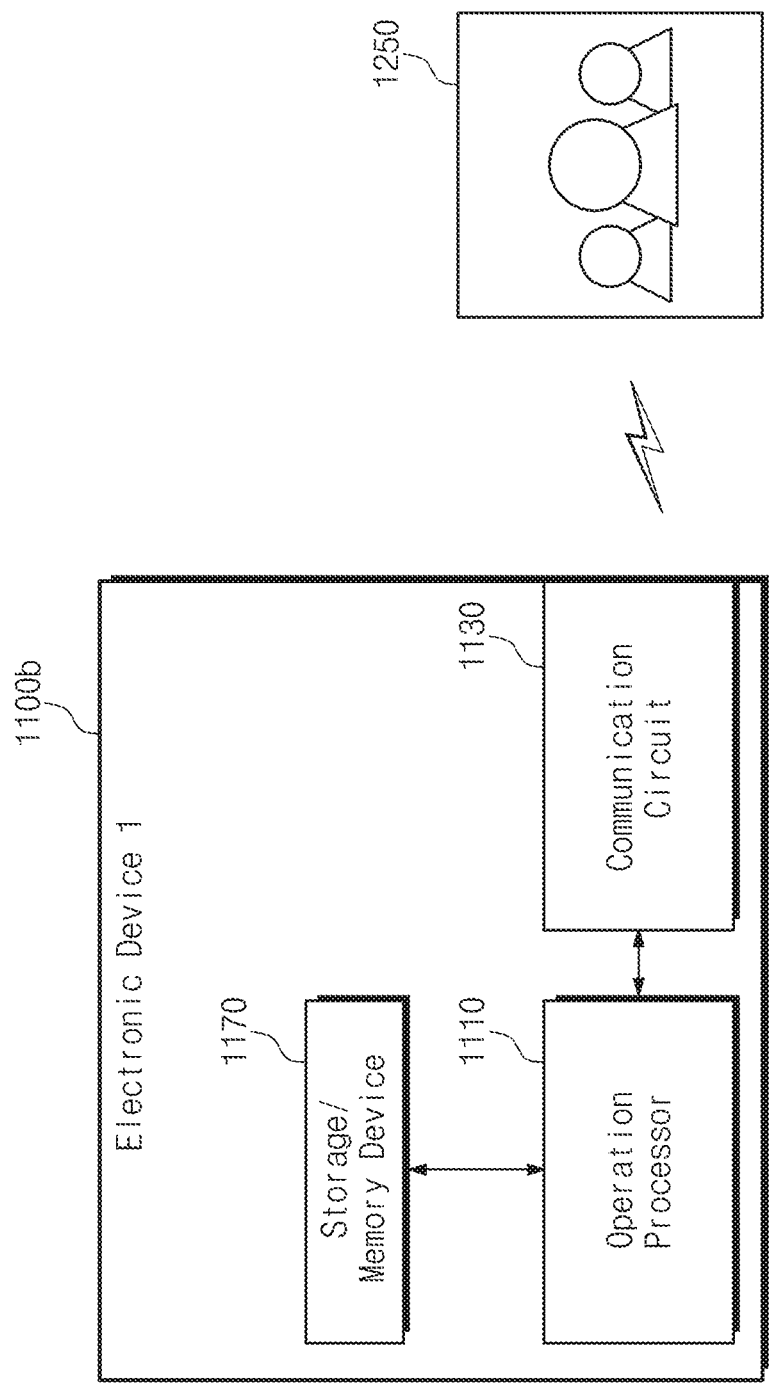
FIG. 3 is a schematic diagram illustrating an example implementation of a first electronic device of FIG. 1.

FIG. 3 is a schematic diagram illustrating an example implementation of a first electronic device of FIG. 1. For example, the first electronic device 1100 of FIG. 1 may include a first electronic device 1100b of FIG. 3.

In some example embodiments, the first electronic device 1100b may include an operation processor 1110, a communication circuit 1130, and a storage/memory device 1170. The configurations and operations of the operation processor 1110 and the communication circuit 1130 have been described with reference to FIG. 1, and thus redundant descriptions will be omitted below for brevity.

The storage/memory device 1170 may store data. For example, the storage/memory device 1170 may include a storage device that is configured to store data permanently or semi-permanently. In some example embodiments, the storage/memory device 1170 may include a memory device that is configured to store data temporarily.

In some example embodiments, the storage/memory device 1170 may store image data that is generated in advance. This image data may be generated in advance by the first electronic device 1100b or another electronic device. In some example embodiments, the storage/memory device 1170 may store image data provided from an external device through the communication circuit 1130. The image data stored in the storage/memory device 1170 may be provided to the operation processor 1110. The operation processor 1110 may encode the image data.

In these example embodiments, the first electronic device 1100b may output an image signal including the image data stored in advance (e.g., the encoded image data). The second electronic device 1200 of FIG. 1 may receive the image signal. The display device 1250 included in the second electronic device 1200 may display an image corresponding to the image signal. When the first electronic device 1100b is employed, the electronic system 1000 of FIG. 1 may be used as a broadcasting system.

The example implementations of the first electronic device 1100 and the operations of the electronic system 1000 have been described with reference to FIGS. 2 and 3. However, the above descriptions are provided to help better understanding the present disclosure. Thus, example embodiments of the present disclosure are not limited thereto. The implementation of the first electronic device 1100 and the operation of the electronic system 1000 may be variously changed or modified.

Figure 4:
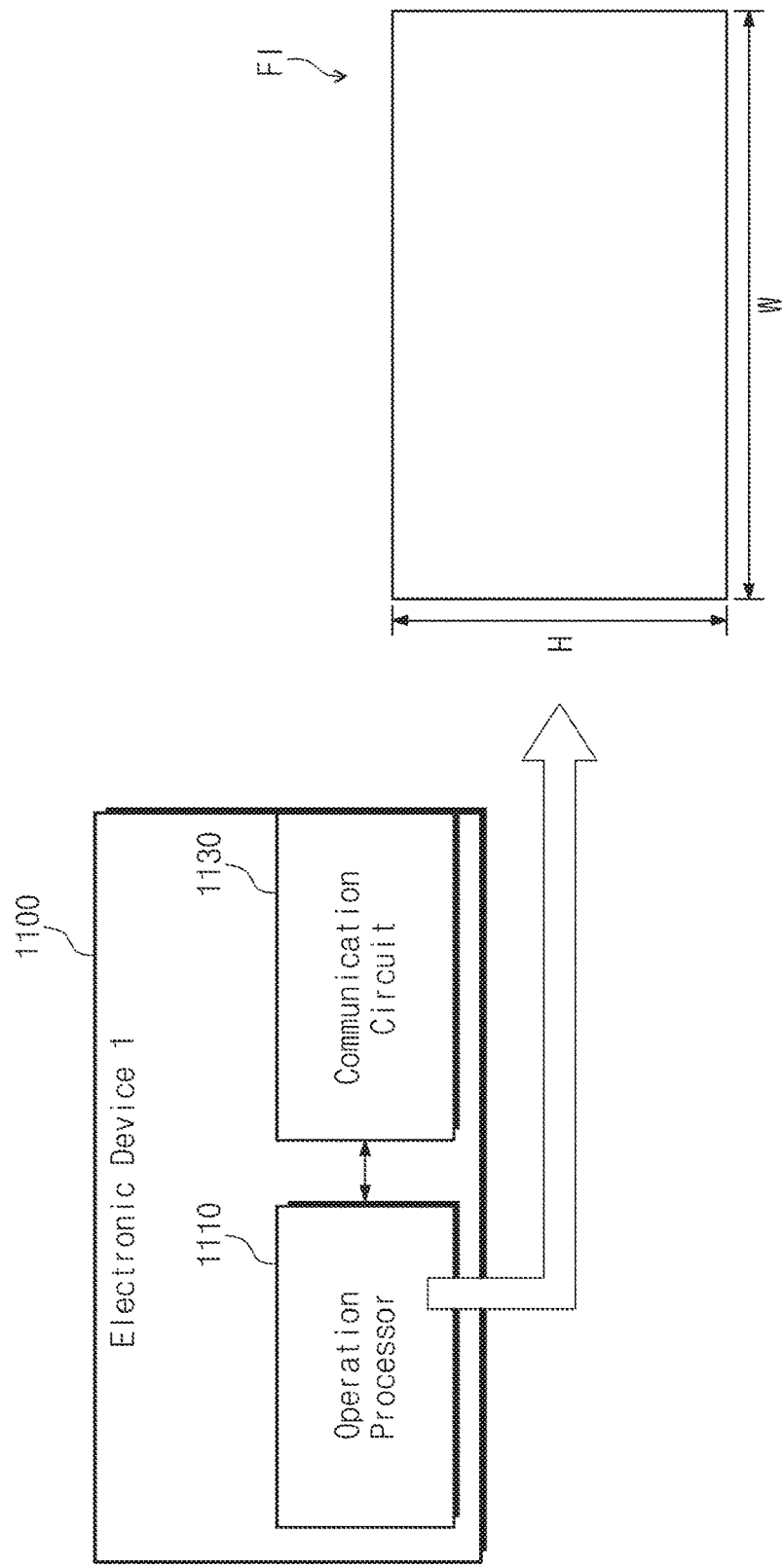
FIG. 4 is a schematic diagram for describing a shape of an image represented by image data at a first electronic device of FIG. 1.

FIG. 4 is a schematic diagram for describing a shape of an image represented by image data at a first electronic device of FIG. 1. For brevity, redundant descriptions associated with the first electronic device 1100 and components thereof will be omitted below.

As described above, a video encoder configured to encode image data may be included in the operation processor 1110 or may be provided separately from the operation processor 1110. The image data may be generated in real time or in advance by the first electronic device 1100.

For example, the first electronic device 1100 may capture a fundamental image FI having a rectangular shape. In some example embodiments, image data processed by a video encoder may represent the fundamental image FI having a rectangular shape. The fundamental image FI may be an image captured by the first electronic device 1100 or prepared in the first electronic device 1100. For example, a ratio of height H to width W of the fundamental image FI may be 1:1.33, 1:1.6, or 1:1.78. The video encoder may encode the image data that represents the fundamental image FI having the rectangular shape.

However, the ratio of height H to width W of the fundamental image FI may be variously changed or modified. Furthermore, the shape of the fundamental image FI may have various shapes. FIG. 4 is provided to help better understanding of the present disclosure, and the present disclosure is not limited thereto.

Figure 5:
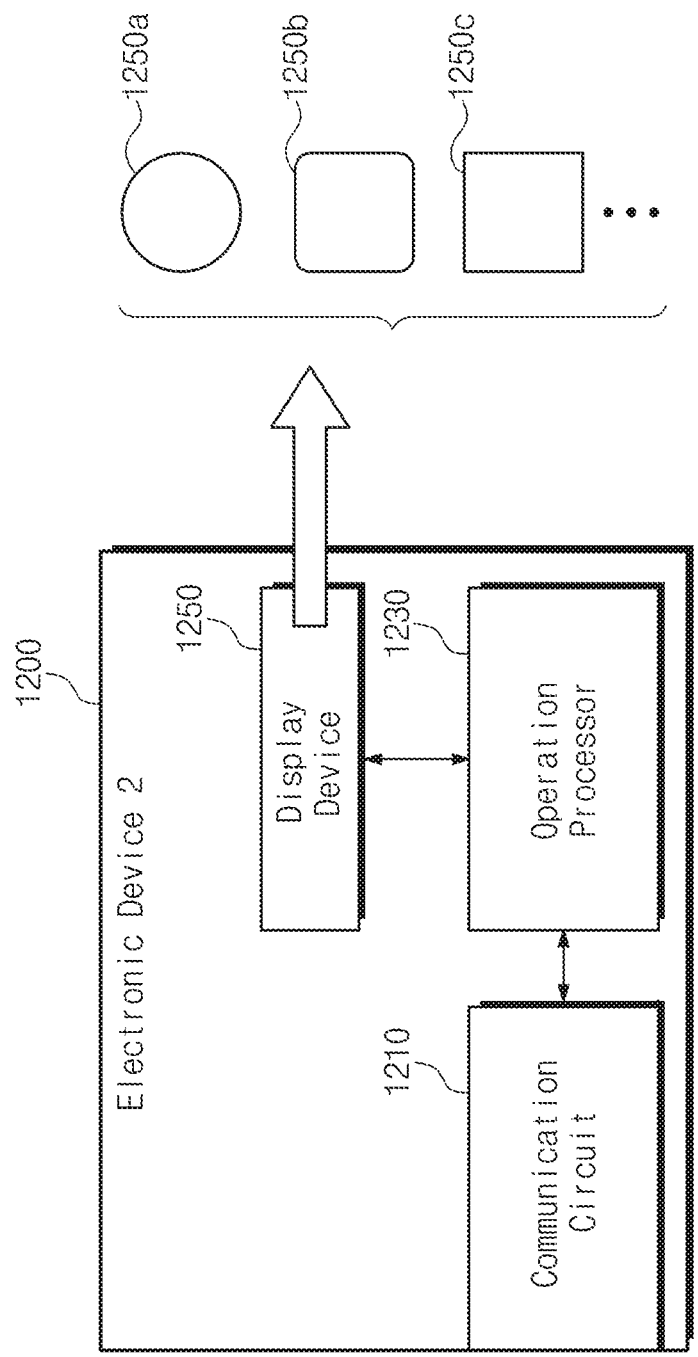
FIG. 5 is a schematic diagram for describing a shape of a display device included in a second electronic device of FIG. 1.
Figure 6:
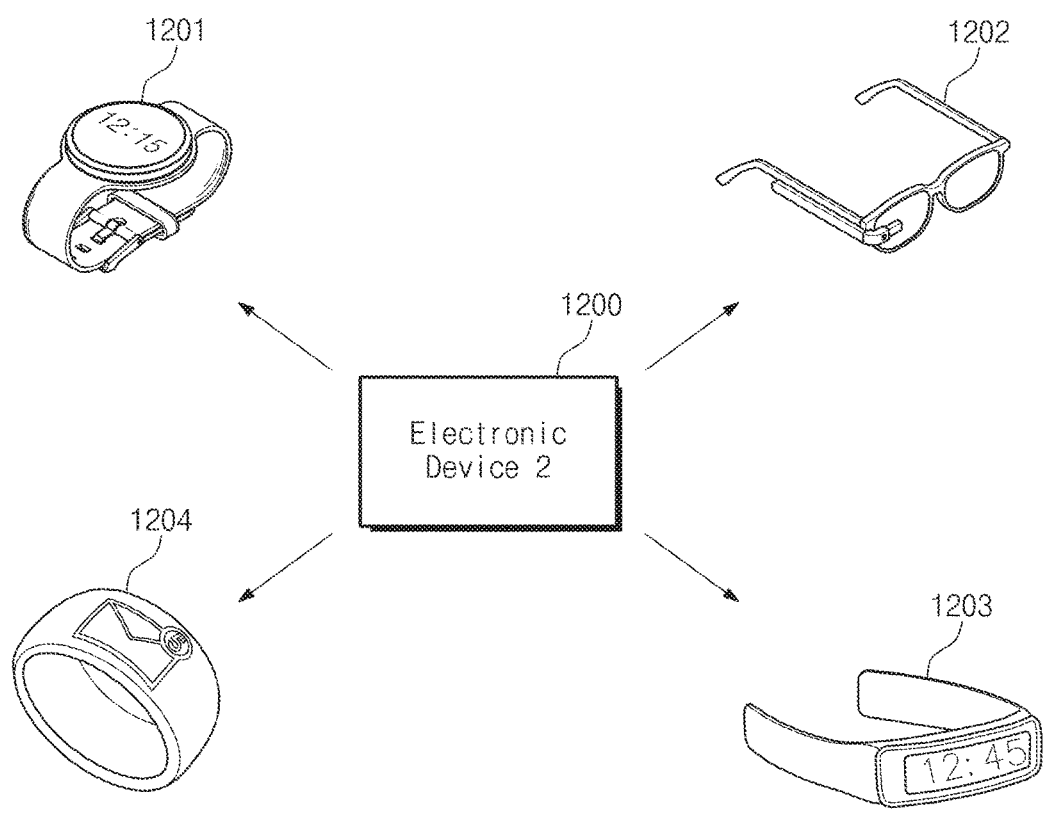
FIG. 6 is a schematic diagram for describing some example implementations of a second electronic device of FIG. 1.

FIG. 5 is a schematic diagram for describing a shape of a display device included in a second electronic device of FIG. 1. FIG. 6 is a schematic diagram for describing some example implementations of a second electronic device of FIG. 1. To help better understanding, FIG. 4 will be referred to together with FIGS. 5 and 6. For brevity, redundant descriptions associated with the second electronic device 1200 and components thereof will be omitted below.

Referring to FIG. 5, the display device 1250 of the second electronic device 1200 may have a non-rectangular shape. For example, the display device 1250 may be one of a circular display device 1250a, a display device 1250b with rounded corners, or a square display device 1250c. That is, the shape of the display device 1250 may be different from a shape of the fundamental image FI.

Referring to FIG. 6, the second electronic device 1200 may be one of a smart watch 1201, a smart glass 1202, a smart band 1203, or a smart ring 1204. That is, the second electronic device 1200 may be an electronic device that includes the display device 1250 having a shape other than, for example, a rectangular shape (a shape of the fundamental image FI). Each of the smart watch 1201, the smart glass 1202, the smart band 1203, and the smart ring 1204 may provide image information to a user through the display device 1250, the shape of which is different from the shape of the fundamental image FI.

In some example embodiments, the display device 1250 may have a shape that is different from the shapes shown in FIG. 5. Furthermore, the second electronic device 1200 may be an electronic device that is not shown in FIG. 6. FIGS. 5 and 6 are provided to help better understanding of the present disclosure, and the present disclosure is not limited thereto.

Below, it will be assumed that the fundamental image FI represented by image data in the first electronic device 1100 has a rectangular shape where height H and width W are different from each other and the second electronic device 1200 includes the circular display device 1250a as in, for example, the smart watch 1201. As described above, this assumption is provided to help understanding of the present disclosure, and the present disclosure is not limited thereto. It would be understood that the example embodiments to be described below also may be applied to the fundamental image FI having other shapes and/or the display device 1250 having other shapes.

Figure 7:
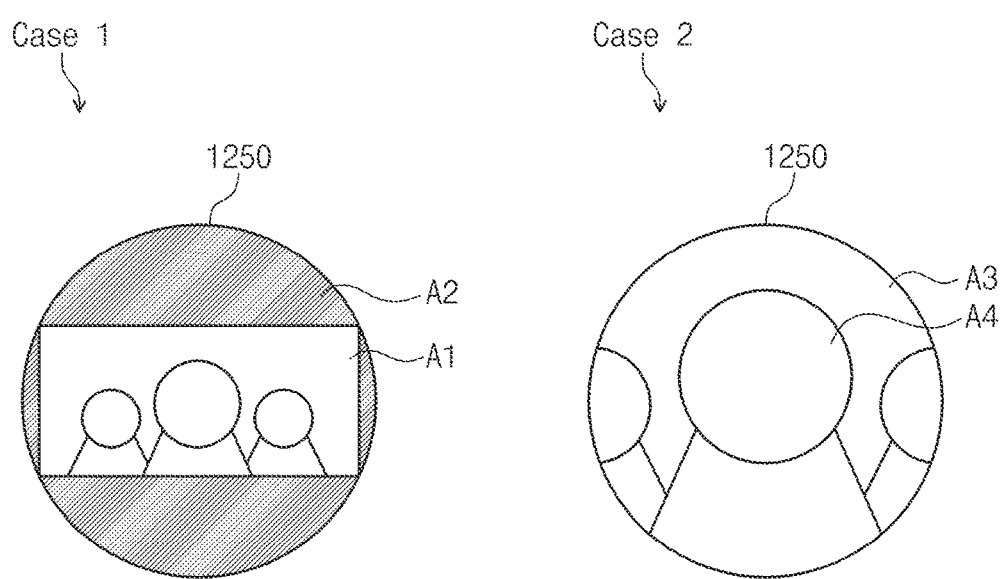
FIG. 7 is a schematic diagram for describing a method of displaying an image on a display device included in a second electronic device of FIG. 1.

FIG. 7 is a schematic diagram for describing a method of displaying an image on a display device included in a second electronic device of FIG. 1. To help better understanding of the present disclosure, FIG. 1 will be referred together with FIG. 7.

According to example of Case 1, the display device 1250 of the second electronic device 1200 may display the whole image corresponding to the fundamental image FI of FIG. 4. For example, the display device 1250 may display an image A1, the size of which is reduced to fit into a shape of the display device 1250. Furthermore, for example, the display device 1250 may not display anything on a remaining area other than the area on which the reduced image A1 is displayed, or may display a non-display image A2 (e.g., a blue color image or a black color image) on the remaining area.

Thus, a user of the second electronic device 1200 may watch the whole image A1 corresponding to the fundamental image FI. However, due to the non-display image A2, the user of the second electronic device 1200 may have a strange feeling, or the concentration of the user may be weakened. Further, in some example embodiments, the visibility of the object OBJ of FIG. 2 may be lowered or compromised.

According to an example of Case 2, the display device 1250 may display a portion of the image corresponding to the fundamental image FI. For example, the display device 1250 may display an image A3 selected from the fundamental image FI to fit into the shape of the display device 1250. For example, the display device 1250 may display the selected image A3 with focusing on a "target of interest" or a "region of interest" A4.

According to the example embodiments to be described below, even though the shape of the fundamental image FT in the first electronic device 1100 is different from the shape of the display device 1250 included in the second electronic device 1200, the strange feeling may be minimized and the concentration of the user may be not be compromised.

Furthermore, as will be described later, speed and efficiency of the image processing and image data transmission may be improved.

Figure 8:
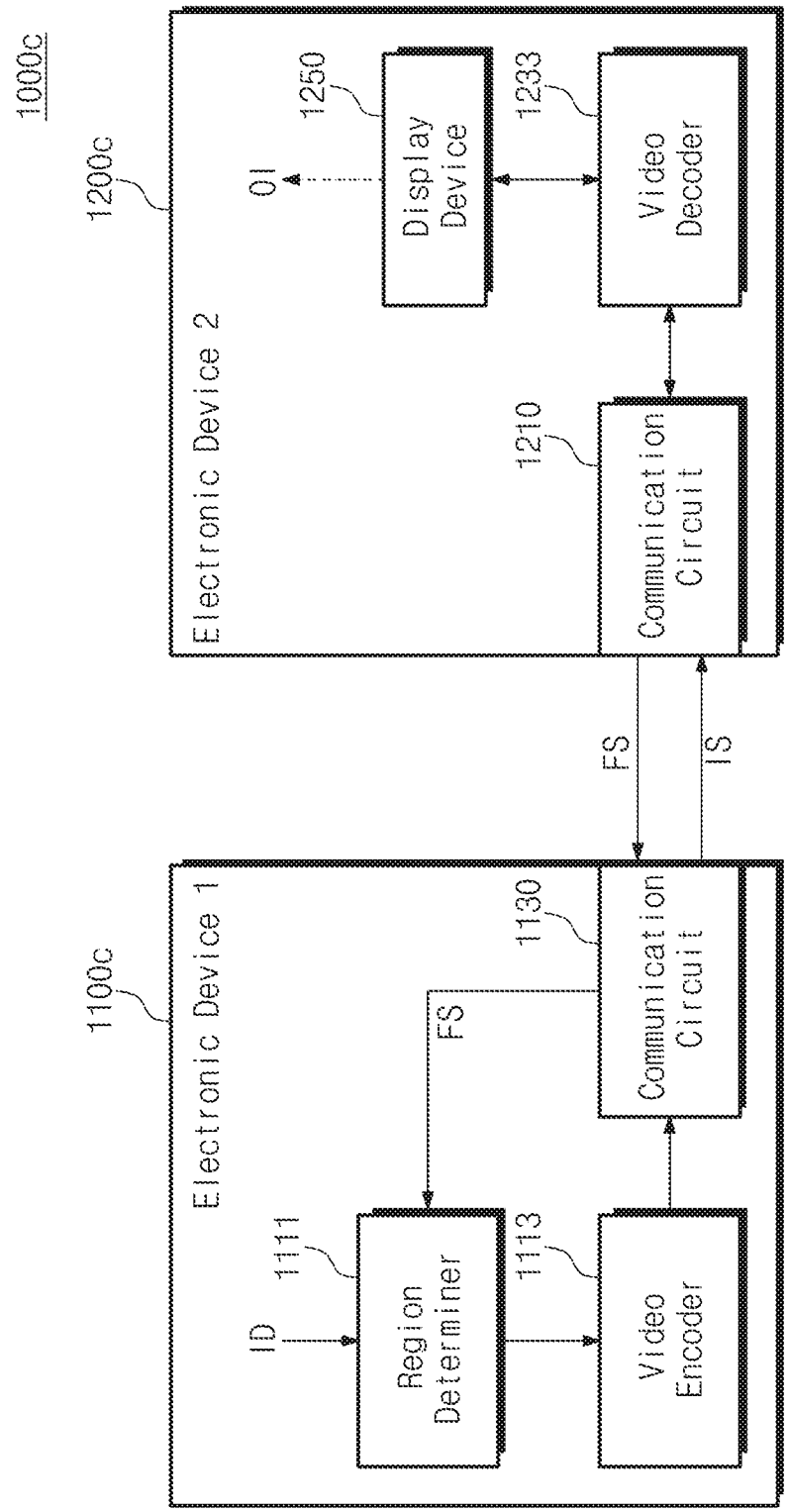
FIG. 8 is a block diagram illustrating an electronic system including electronic devices, according to an example embodiment.

FIG. 8 is a block diagram illustrating an electronic system including electronic devices, according to an example embodiment. An electronic system 1000c may include a first electronic device 1100c and a second electronic device 1200c.

In some example embodiments, the first electronic device 1100c may include a region determiner 1111, a video encoder 1113, and the communication circuit 1130. For example, the operation processor 1110 of the FIG. 1 may include at least one of the region determiner 1111 or the video encoder 1113. In some example embodiments, the region determiner 1111 and the video encoder 1113 may be provided separately from the operation processor 1110 of FIG. 1. The configurations and operations of the communication circuit 1130 have been described with reference to FIG. 1, and thus redundant descriptions will be omitted below for brevity.

The region determiner 1111 may receive image data ID. The image data ID may be generated by the first electronic device 1100c in real time (refer to FIG. 2). In some example embodiments, the image data ID may be prepared by the first electronic device 1100c in advance (refer to FIG. 3).

The region determiner 1111 may divide an image represented by the image data ID (e.g., the fundamental image FI of FIG. 4) into a first region and a second region. For example, the communication circuit 1130 may receive an information signal FS from the second electronic device 1200c, and the region determiner 1111 may determine the first and second regions based on the information signal FS. Dividing the regions by the region determiner 1111 will be described in more detail with reference to FIG. 10.

The video encoder 1113 may encode the image data ID. The image data ID may include first image data corresponding to the first region and second image data corresponding to the second region. The video encoder 1113 may encode the first image data and the second image data by, for example, different encoding manners. For example, the video encoder 1113 may encode the first image data by a first encoding manner, and may encode the second image data by a second encoding manner. The encoding manners of the video encoder 1113 will be described in more detail with reference to FIGS. 10 and 11.

The communication circuit 1130 may output an image signal IS to the second electronic device 1200c. The image signal IS may include at least the encoded first image data. As will be described later, an entirety or a portion of an image represented by the first image data may be displayed on the display device 1250 of the second electronic device 1200c. An image represented by the second image data may not be displayed on the display device 1250 of the second electronic device 1200c. In some example embodiments, the image signal IS may include the encoded second image data in some example embodiments, the image signal IS may not include an entirety or a portion of the encoded second image data. These example embodiments will be described in more detail with reference to FIGS. 13 and 14.

In some example embodiments, the second electronic device 1200c may include the communication circuit 1210, a video decoder 1233, and the display device 1250. For example, the operation processor 1230 of the FIG. 1 may include the video decoder 1233. The video decoder 1233 may be provided separately from the operation processor 1230. The configurations and operations of the communication circuit 1210 have been described with reference to FIG. 1, and thus redundant descriptions will be omitted below.

The communication circuit 1210 may receive the image signal IS from the first electronic device 1100c. As described above, the image signal IS may include at least the encoded first image data.

The video decoder 1233 may decode image data included in the image signal IS. For example, the video decoder 1233 may decode the encoded first image data included in the image signal IS. In some example embodiments, when the image signal IS includes the encoded second image data, the video decoder 1233 may further decode the encoded second image data. For example, the video decoder 1233 may decode the first image data by a first decoding manner, and may decode the second image data by a second decoding manner. For another example, the video decoder 1233 may decode the first image data and the second image data by the same decoding manner. The decoding manners of the video decoder 1233 will be described in more detail with reference to FIG. 15.

In some example embodiments, the first image data and the second image data may be decoded by different decoding manners. However, this does not mean that the video decoder 1233 should include two separate decoders or employs two different video decoding schemes. The first image data and the second image data may be decoded together in the order of pixel or block position, based on the same video decoding scheme.

The display device 1250 may display an output image OI. The output image OI may be displayed based on image data decoded by the video decoder 1233. For example, the display device 1250 may display an entirety or a portion of an image represented by the decoded first image data. The output image OI may correspond to an entirety or a portion of the image represented by the decoded first image data. Displaying the output image OI will be described in more detail with reference to FIGS. 9 to 15.

The communication circuit 1210 may provide the information signal FS to the first electronic device 1100c. For example, the information signal FS may include information associated with a shape of the display device 1250. The second electronic device 1200c may be implemented such that a memory (not shown) included in the second electronic device 1200c stores information associated with a type of the second electronic device 1200c, a shape of the display device 1250, a communication protocol employed in the communication circuit 1210, and/or the like. Under control of the operation processor 1230 of FIG. 1, the communication circuit 1210 may output the information signal FS.

The region determiner 1111 may determine the first region and the second region based on the information signal FS. Therefore, the region determiner 1111 may differently determine the first region and the second region depending on the shape of the display device 1250. In some example embodiments, the shape of the fundamental image FI represented by the image data ID may be different from the shape of the display device 1250, and the video encoder 1113 and the video decoder 1233 may differently perform encoding/decoding operations depending on the shape of the display device 1250.

Figure 9:
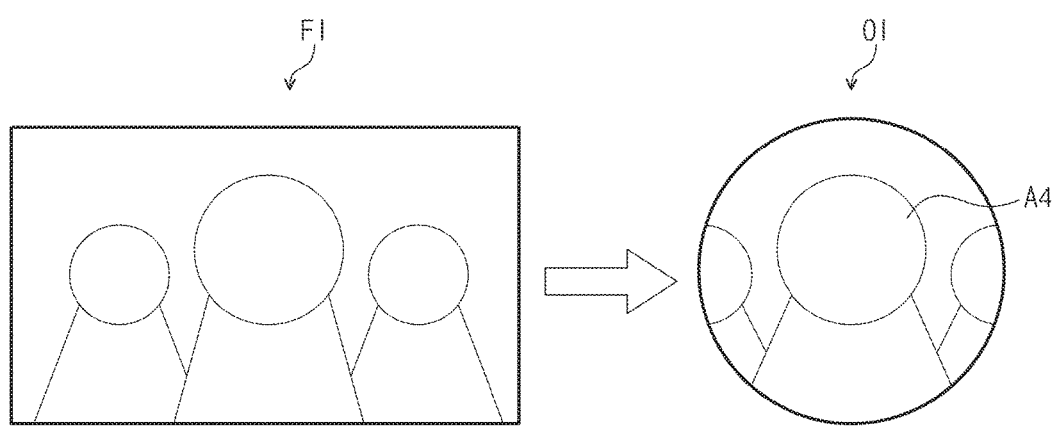
FIG. 9 is a schematic diagram for describing a fundamental image and an output image according to an example embodiment.

FIG. 9 is a schematic diagram for describing a fundamental image and an output image according to an example embodiment. To help better understanding, FIG. 8 will be referred together with FIG. 9.

For example, image data ID may include data used to represent the fundamental image FI. As assumed above, the fundamental image FI may have a rectangular shape where height and width are different from each other.

However, a shape of the display device 1250 of the second electronic device 1200c may be different from a shape of the fundamental image FI. For example, as assumed above, the display device 1250 may have a circular shape.

As described with reference to FIG. 7, the display device 1250 may display a portion of an image corresponding to the fundamental image FI. For example, the display device 1250 may display the output image OI selected from the fundamental image FI so as to fit into the shape of the display device 1250. For example, the display device 1250 may display the output image OI with focusing a target of interest or a region of interest A4.

Figure 10:
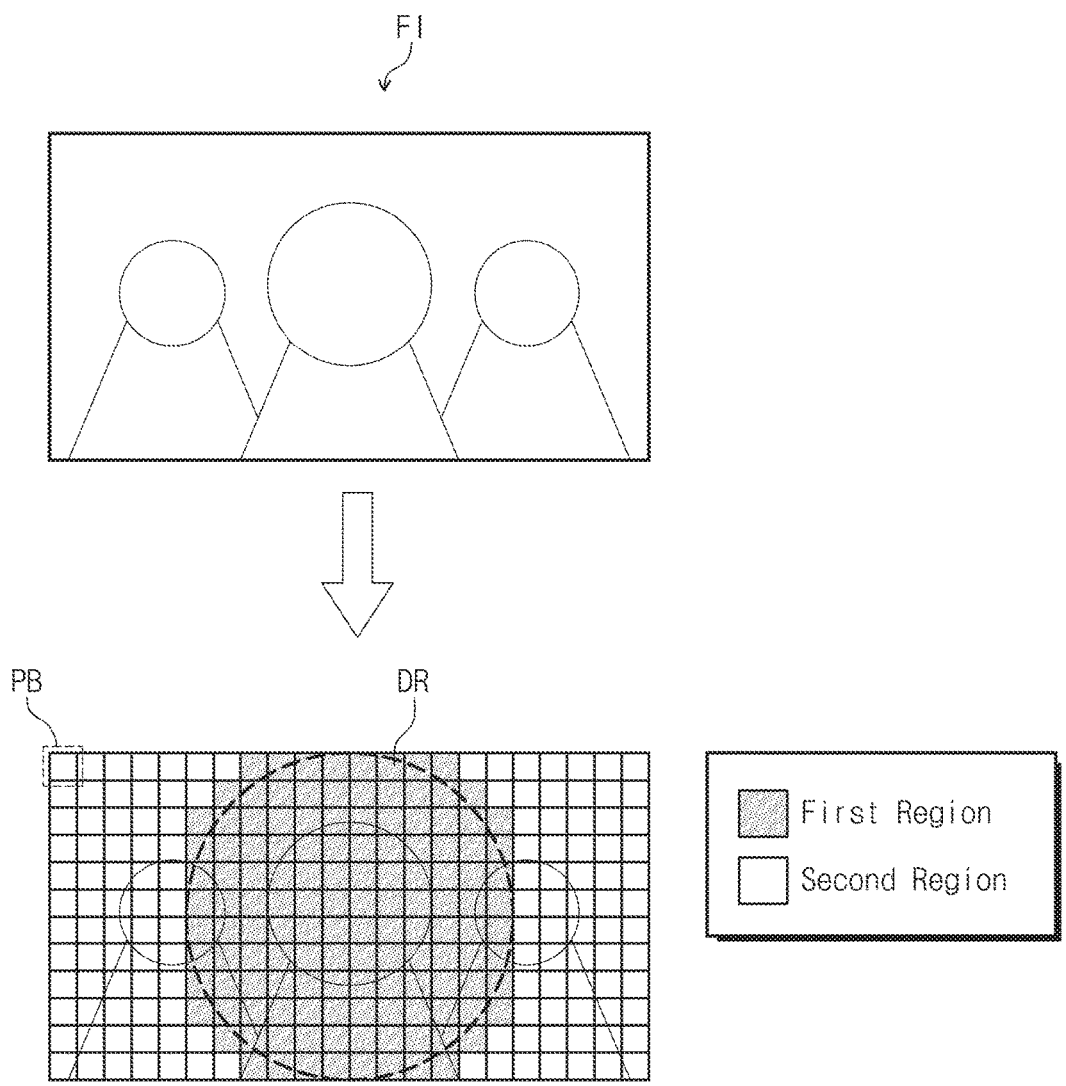
FIG. 10 is a schematic diagram for describing a procedure of processing image data at a first electronic device of FIG. 1 or FIG. 8.
Figure 11:
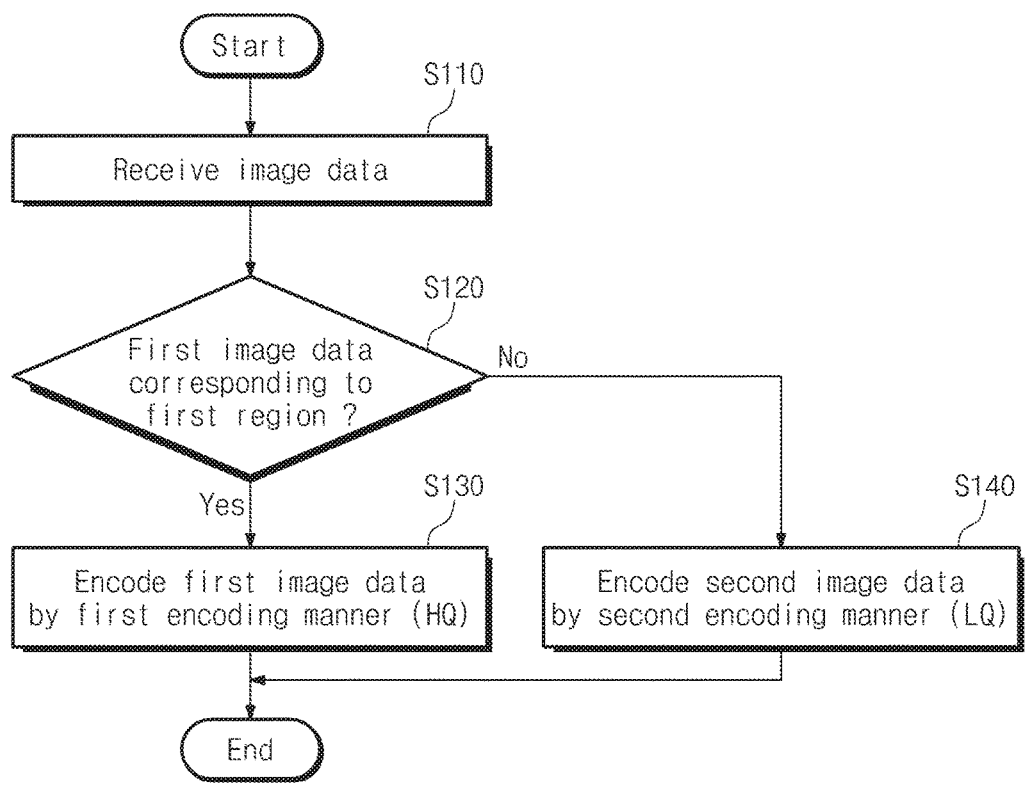
FIG. 11 is a flowchart describing a procedure of processing image data at a first electronic device of FIG. 1 or FIG. 8.

FIG. 10 is a schematic diagram for describing a procedure of processing image data at a first electronic device of FIG. 1 or FIG. 8. FIG. 11 is a flowchart describing a procedure of processing image data at a first electronic device of FIG. 1 or FIG. 8. The procedure for processing image data based on the fundamental image FI of FIG. 9 will be described with reference to FIGS. 10 and 11. To help better understanding, FIG. 8 will be referred together with FIGS. 10 and 11.

FIG. 10 illustrates the fundamental image FI represented by the image data ID. To encode the image data ID corresponding to the fundamental image FI, the fundamental image FI may be divided into a plurality of processing blocks PBs.

The processing block PB may correspond to a unit for video encoding/decoding. The video encoder 1113 may perform video encoding in a unit of the processing block PB, and the video decoder 1233 may perform video decoding in a unit of the processing block PB. Performing the video encoding/decoding in a unit of the processing block PB is well known, and thus detailed description thereof will be omitted. The processing block PB may have various sizes (e.g., 4 pixels by 4 pixels or 16 pixels by 16 pixels). The size of the processing block PB may vary depending on video encoding/decoding conditions.

In FIG. 10, an outline of a display region DR corresponding to the output image OI to be displayed on the display device 1250 is denoted by a bold dotted circle. The display region DR inside the bold dotted circle may be selected to correspond to a shape of the display device 1250.

In FIG. 10, a first region is filled with a shaded rectangle, and a second region is filled with a white rectangle. The region determiner 1111 may determine the first region such that the processing blocks PBs completely contained inside the display region DR correspond to the first region. Furthermore, the region determiner 1111 may determine the first region such that the processing blocks PBs overlapping with the outline of the display region DR correspond to the first region. Meanwhile, the region determiner 1111 may determine the second region such that the processing blocks PBs which do not correspond to the first region correspond to the second region.

Therefore, the first region may include the display region DR corresponding to the output image OI to be displayed on the display device 1250. On the other hand, the second region may be separate from the display region DR. Accordingly, first image data corresponding to the first region may be used to display the output image OI, and second image data corresponding to the second region may not be used to display the output image OI.

As the first region and the second region are distinguished by the region determiner 1111, a boundary between the first region and the second region may be determined. The first region may be provided inside the determined boundary, and the second region may be provided outside the determined boundary.

The first region may be determined to include the display region DR. The display region DR may be selected to correspond to the shape of the display device 1250. Therefore, the outline of the first region (that is, a boundary between the first region and the second region) may vary depending on the shape of the display device 1250.

Referring to FIG. 11, in operation S110, the region determiner 1111 may receive the image data ID. As described with reference to FIG. 10, the region determiner 1111 may divide the fundamental image FI represented by the image data ID into the first region and the second region. For example, the region determiner 1111 may add region information to the image data ID. The region information may indicate whether a specific processing block PB corresponds to the first region or the second region. For another example, the region determiner 1111 may generate region information data, separately from the image data ID, which includes the region information.

The video encoder 1113 may receive the image data ID and the region information. The video encoder 1113 may encode the image data ID in a unit of processing block PB. In operation S120, the video encoder 1113 may determine, based on the region information, whether the image data ID corresponding to the processing block PB to be processed is the first image data corresponding to the first region. In some example embodiments, the video encoder 1113 may further determine, based on the region information, whether the image data ID corresponding to the processing block PB to be processed is the second image data corresponding to the second region.

When the processing block PB to be processed corresponds to the first image data, operation S130 may be performed. In operation S130, the video encoder 1113 may encode the first image data by a first encoding manner. On the other hand, when the processing block PB to be processed corresponds to the second image data, operation S140 may be performed. In operation S140, the video encoder 1113 may encode the second image data by a second encoding manner.

That is, the video encoder 1113 may differently encode the first image data and the second image data. Operations S120 to S140 may be repeated until the video encoder 1113 encodes image data of the entire processing blocks PBs.

In some example embodiments, the first encoding manner may encode with relatively high quality (HQ) (in other words, high definition or high resolution), and the second encoding manner may encode with relatively low quality (LQ) (in other words, low definition or low resolution). The first encoding manner may encode with higher quality than the second encoding manner. For example, the encoding quality may be determined by adjusting a quantization parameter of a video encoding/decoding scheme, but the present disclosure is not limited thereto.

The first image data (not the second image data) may be used to display the output image OI. Thus, to clearly display the output image OI, the first image data may be encoded by a first encoding manner of relatively high quality (HQ). Because the second image data is not used to display the output image OI, it may be acceptable that the second image data is encoded by a second encoding manner of relatively low quality (LQ). By performing such a "non-uniform" video encoding depending on the shape of the display device 1250, speed and efficiency of the image processing may be improved.

The communication circuit 1130 may receive the encoded image data. The communication circuit 1130 may transmit the image signal IS including at least the encoded first image data to the second electronic device 1200c. Accordingly, the second electronic device 1200c may receive the encoded first image data included in the image signal IS. Based on the first image data, the second electronic device 1200c may display the output image OI corresponding to the display region DR on the display device 1250. Because the second image data is encoded at low quality, the data quantity of the image signal IS may be reduced, thus speed and efficiency of the image data transmission may be improved.

The processes of selecting the display region DR corresponding to the shape of the display device 1250, dividing the fundamental image FI into the first and second regions based on the display region DR, and encoding the first and second regions by different encoding manners have been described with reference to FIGS. 10 and 11. Herein, the display region DR and the first region may be selected in various ways.

In some example embodiments, the display region DR and the first region may be determined to include image data associated with a "target of interest". For instance, the target of interest may be determined by a first electronic device (e.g., the first electronic device 1100 of FIG. 1, the first electronic device 1100a of FIG. 2, or the first electronic device 1100c of FIG. 8).

For example, referring to FIG. 2, the operation processor 1110 may process a facial recognition operation (e.g., an operation to analyze the location of pupil) on the object OBJ, based on the image data received from the image signal processor 1155. The operation processor 1110 may determine the person, who is looking at the image sensor 1150 from among the object OBJ, as the target of interest based on the facial recognition result. For another example, the operation processor 1110 may trace a sound/voice generated by the object OBJ, based on the audio data received from the audio signal processor 1165. The operation processor 1110 may determine the person, who is talking toward to the audio sensor 1160, as the target of interest based on the voice tracing result.

In some example embodiments, the display region DR and the first region may be determined to correspond to a "region of interest". For example, the region of interest may include a region requested by a user of the second electronic device 1200C so as to be displayed on the display device 1250. The region of interest will be described in detail with reference to FIGS. 16 to 19.

In some example embodiments, the display region DR and the first region may be determined to correspond to a middle region of the fundamental image FI as illustrated in FIG. 10. For example, when the target of interest or the region of interest is not determined, the middle region of the fundamental image FI may be provided as an initial value of the display region DR. However, the above example embodiments are provided to help better understanding, and the present disclosure is not limited thereto.

Figure 12:
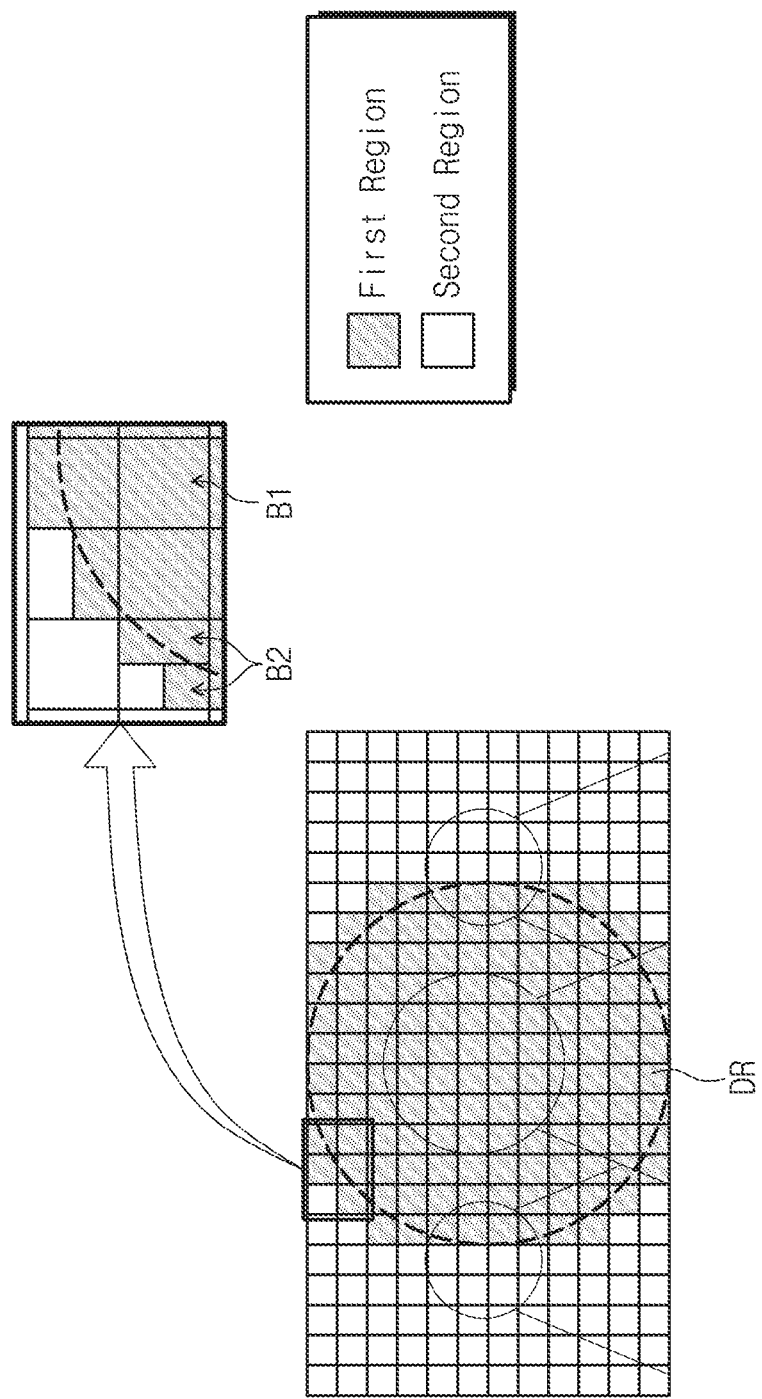
FIG. 12 is a schematic diagram for describing a procedure of processing an outline of a display region, in processing of image data of FIGS. 10 and 11.

FIG. 12 is a schematic diagram for describing a procedure of processing an outline of a display region, in processing of image data of FIGS. 10 and 11. At the upper portion of FIG. 12, some processing blocks are illustrated as being enlarged. To help better understanding. FIGS. 8 and 10 will be referred together with FIG. 12.

A first region may include a region B1 that is completely contained inside the display region DR. Furthermore, the first region may include a region B2 overlapping with the outline of the display region DR. A second region may not be included in the display region DR and may not overlap with the outline of the display region DR.

As described above, the video encoder 1113 may perform video encoding in a unit of the processing block PB. Furthermore, in some example embodiments, the video encoder 1113 may perform video encoding in a unit of a "sub-block," the size of which is smaller than the size of the processing block PB. The sub-block may be obtained by further dividing the processing block PB and may have the size of, for example, 4 pixels by 2 pixels or 2 pixels by 2 pixels. For example, when the video encoder 1113 employs an encoding/decoding scheme based on, for example, HEVC specification or VP9 specification, the video encoder 1113 may process image data composed of processing blocks PBs together with image data composed of sub-blocks.

The region B1 completely contained inside the display region DR may be processed in a unit of the processing block PB. However, the processing block PB overlapping with the outline of the display region DR may include image data that are not desired to represent the output image OI. In some example embodiments, the processing block PB overlapping with the outline of the display region DR may be further divided into a plurality of sub-blocks. Accordingly, the region B2 overlapping with the outline of the display region DR may be processed in a unit of the sub-block.

The region B2 overlapping with the outline of the display region DR may be encoded by the first encoding manner in a unit of the sub-block, the size of which is smaller than a unit of the processing block PB for the region B1, which is completely contained inside the display region DR. According to the example embodiment, the quantity of the first image data to be encoded by the first encoding manner may be reduced. Thus, speed and efficiency of the image processing and the image data transmission may be further improved. Some regions overlapping with the outline of the display region DR still may be processed in a unit of the processing block PB.

Figures 13, 14:
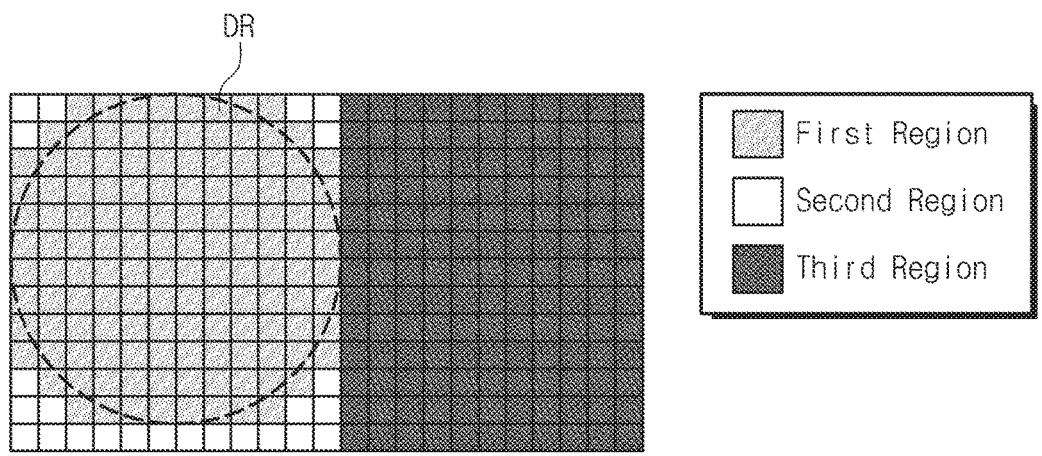
FIG. 13 is a schematic diagram for describing a procedure of processing image data of a region that is not displayed on a display device, in processing of image data of FIGS. 10 and 11.
FIG. 14 is a table showing methods of processing divided regions, in processing of image data of FIGS. 10, 11, and 13.

FIG. 13 is a schematic diagram for describing a procedure of processing image data of a region that is not displayed on a display device, in processing of image data of FIGS. 10 and 11. To help better understanding, FIGS. 8 and 10 will be referred together with FIG. 13.

As described above, the region determiner 1111 may divide the fundamental image FI into the first region and the second region depending on a shape of the display device 1250. In some example embodiments, the region determiner 1111 may divide the fundamental image FI into first, second, and third regions. In FIG. 13, the third region is denoted by a rectangle shaded to be darker than the first region.

The third region may correspond to a region that is not displayed on the display device 1250. Therefore, the third region may be located outside the display region DR and may not overlap with the first region. Furthermore the third region may not overlap with the second region. For example, referring to FIG. 13, the third region may not share columns of the first and second regions.

An image represented by third image data corresponding to the third region may not be displayed on the display device 1250. The third image data corresponding to the third region may not be referred to at all to encode the first image data corresponding to the first region. Therefore, in some example embodiments, the third region may be managed differently from the first and second regions. To this end, the region determiner 1111 may further determine the third region in addition to the first and second regions. Managing the third region will be described with reference to FIG. 14.

FIG. 14 is a table showing methods of processing divided regions, in processing of image data of FIGS. 10, 11, and 13. To help better understanding, FIGS. 8, 10, and 13 will be referred together with FIG. 14.

As described above, the video encoder 1113 may encode first image data corresponding to a first region by a first encoding manner. The video encoder 1113 may encode second image data corresponding to a second region by a second encoding manner. The communication circuit 1130 may transmit the image signal IS including at least the encoded first image data to the second electronic device 1200c. In some example embodiments, in order to decode the first image data in the second electronic device 1200c, the image signal IS may further include the encoded second image data.

In some example embodiments, the video encoder 1113 may encode third image data corresponding to a third region together with the second image data by the second encoding manner. For example, as described with reference to FIG. 10, in the case that the region determiner 1111 divides the fundamental image FI into two regions (e.g., the first and second regions), the third image data may correspond to the second region, and the second image data and the third image data may be encoded by the second encoding manner.

In some example embodiments, the video encoder 1113 may encode the third image data by a third encoding manner. For example, the third encoding manner may have an encoding characteristic, which is much lower quality than the encoding characteristic of the second encoding manner. In the case that the third image data is encoded by the second encoding manner or the third encoding manner, the image signal IS transmitted to the second electronic device 1200c may further include the encoded third image data. In some example embodiment, because the third image data is not used to represent the output image OI, the image signal IS may not include information for the third image data. In this case, speed and efficiency of the image data transmission may be further improved.

In some example embodiments, the video encoder 1113 may not encode the third image data. In this case, speed and efficiency of the image processing may be further improved. In the case that the third image data is not encoded, the image signal IS may not include information for the third image data.

The above example embodiments and the above examples are provided to help better understanding, but the present disclosure is not limited thereto. The example embodiments may be variously changed or modified to encode the image data in various manners depending on the shape of the display device 1250.

Figure 15:
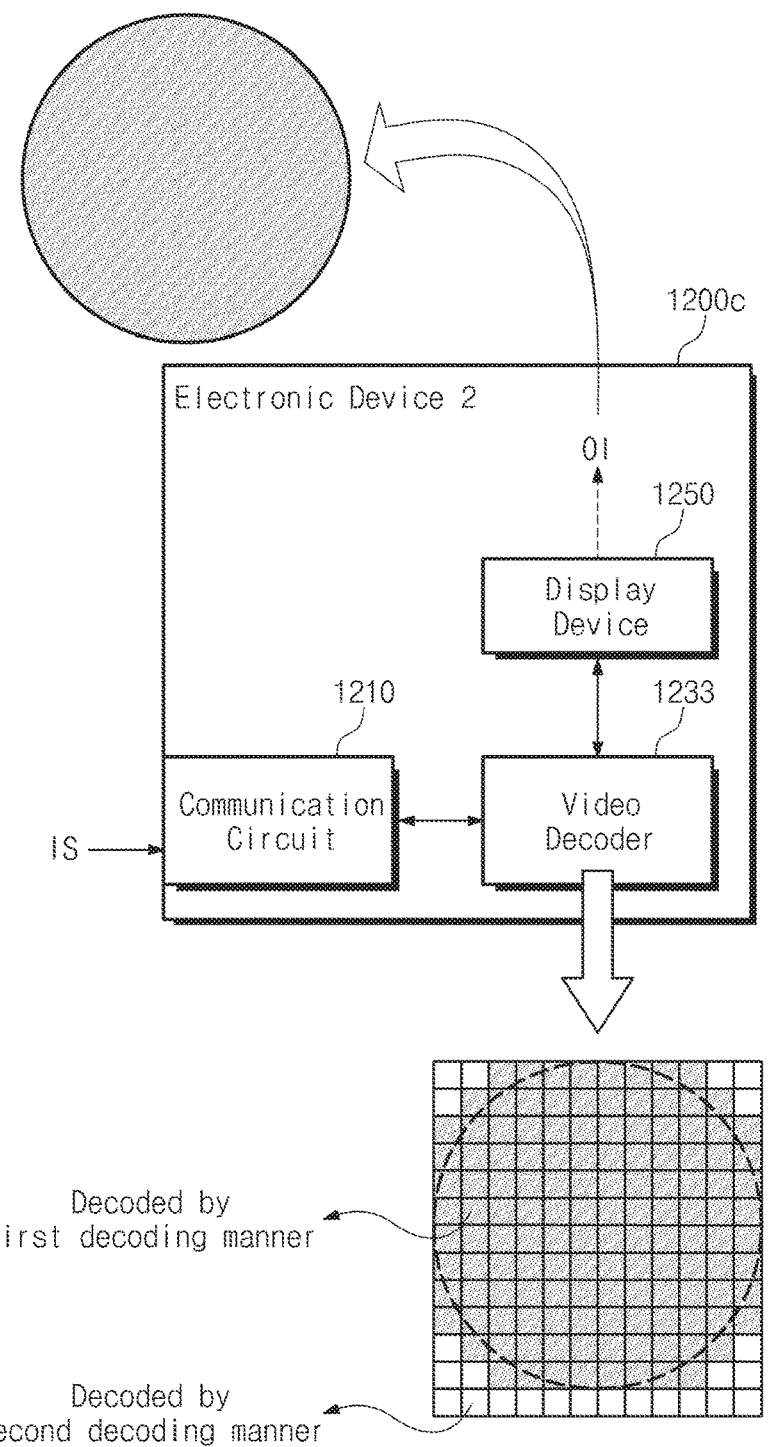
FIG. 15 is a schematic diagram for describing a procedure of processing image data at a second electronic device of FIG. 1 or FIG. 8.

FIG. 15 is a schematic diagram for describing a procedure of processing image data at a second electronic device of FIG. 1 or FIG. 8. To help better understanding, FIGS. 8 and 10 will be referred together with FIG. 15. Configurations and operations of the second electronic device 1200c and components thereof have been described with reference to FIGS. 1 and 8, and thus redundant descriptions will be omitted below for brevity.

The communication circuit 1210 may receive the image signal IS from the first electronic device 1100, 1100a, 1100b, or 1100c. The video decoder 1233 may decode image data included in the image signal IS. Herein, the image data may include the encoded first image data and the encoded second image data that are distinguished based on a shape of the display device 1250.

FIG. 15 illustrates a first region including a display region determined based on the shape of the display device 1250 and a second region other than the first region. The video decoder 1233 may decode a portion of the image data (e.g., the encoded first image data corresponding to the first region) included in the image signal IS by a first decoding manner. Further, the video decoder 1233 may decode another portion of the image data (e.g., the encoded second image data corresponding the second region) included in the image signal IS by a second decoding manner. This is because, as described above, the first image data is encoded by the first encoding manner and the second image data is encoded by the second encoding manner. The first decoding manner may correspond to the first encoding manner, and the second decoding manner may correspond to the second encoding manner.

The video decoder 1233 may obtain first image data and second image data by the first decoding manner and the second decoding manner, respectively. In some example embodiments, the first decoding manner may have a decoding characteristic of higher quality than the second decoding manner. The display device 1250 may display the output image OI based on the first image data decoded by the video decoder 1233. The output image OI may be represented by an entirety or a portion of the first image data. An image represented by the second image data may not be displayed on the display device 1250.

In some example embodiments, the video decoder 1233 may obtain one piece of image data by one decoding manner. In this example embodiment, the one piece of image data may be obtained by decoding the image data encoded by the first encoding manner and the image data encoded by the second encoding manner. Herein, the image data encoded by the first encoding manner and the image data encoded by the second encoding manner may be arranged in a specific order (e.g., a raster scan order) so as to form one piece of encoded data. In such an example embodiment, in the image represented by the obtained one piece of image data, the output image OI may be displayed at higher quality than the other image region(s).

According to the example embodiments, the image data included in the image signal IS may vary depending on the shape of the display device 1250. Furthermore, the output image OI may be also determined depending on the shape of the display device 1250. Therefore, even though the shape of the fundamental image FI that is captured and processed by the first electronic device 1100, 1100a, 1100b, or 1100c is different from the shape of the display device 1250, the output image OI may be displayed on the display device 1250 while minimizing a strange feeling.

Figure 16:
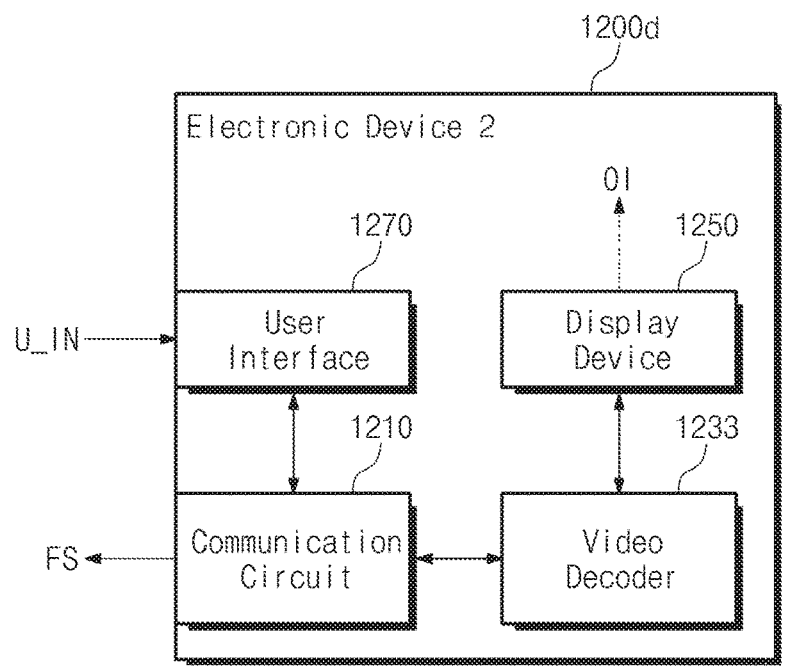
FIG. 16 is a schematic diagram for describing an example implementation of a second electronic device of FIG. 1 or FIG. 8.

FIG. 16 is a schematic diagram for describing an example implementation of a second electronic device of FIG. 1 or FIG. 8. For example, the second electronic device 1200 of FIG. 1 or the second electronic device 1200c of FIG. 8 may include a second electronic device 1200d of FIG. 16.

In some example embodiments, the second electronic device 1200d may include a communication circuit 1210, a video decoder 1233, a display device 1250, and a user interface 1270. Configurations and operations of the communication circuit 1210, the video decoder 1233, and the display device 1250 have been described with reference to FIG. 8, and thus redundant descriptions will be omitted below for brevity.

The user interface 1270 may receive user input U_IN. The user input U_IN may be provided from a user of the second electronic device 1200d. For example, the user interface 1270 may include one or more of various input interfaces, such as a physical button and/or knob, a touch screen, a gyroscope sensor, a gesture sensor, and/or the like, to receive the user input U_IN. The user of the second electronic device 1200*d* may provide the user input U_IN to the second electronic device 1200*d* through the user interface 1270.

For example, the user may provide the user input U_IN to select a "region of interest" to be displayed on the display device 1250. As described above, the region of interest may include a region requested by the user so as to be displayed on the display device 1250.

When the user intends to watch a specific portion of the fundamental image FI of FIG. 10, the user may provide the user input U_IN to select and watch the specific portion from the display device 1250. The user may provide the user input U_IN to determine at least one of a location or a size of the region of interest.

The communication circuit 1210 may provide the information signal FS to the first electronic device 1100, 1100*a*, 1100*b*, or 1100*c*. As described above, the information signal FS may include information associated with a shape of the display device 1250. Furthermore, the information signal FS may further include information associated with the region of interest (e.g., information associated with at least one of the location or the size of the region of interest in the fundamental image FI).

Referring to FIGS. 8 and 10, the region determiner 1111 of the first electronic device 1100*c* may divide the fundamental image FI into first and second regions based on the information signal FS. When the information signal FS includes information associated with the region of interest, the region determiner 1111 may determine the first and second regions such that the display region DR and the first region correspond to the region of interest. At least one of the location or the size of the first region may be changed based on the information signal FS. In some example embodiments, even though there is the first region determined in advance by the region determiner 1111, the user's request may be processed with higher priority.

In the example embodiments, the display device 1250 may display a portion of the fundamental image FI. Therefore, the user may watch an image of a somewhat limited area. However, according to the example embodiments using the region of interest, the user may watch an image that the user wants to watch. Accordingly, the inconvenience of watching the somewhat limited area may be relieved.

Figure 17:
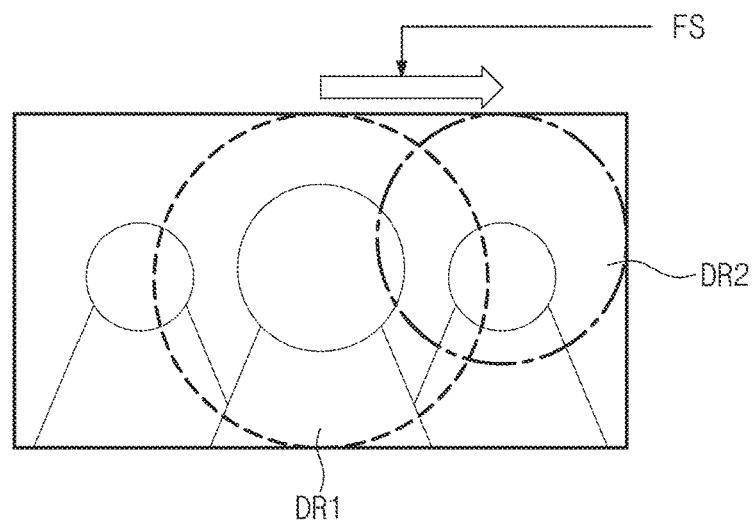
FIG. 17 is a schematic diagram for describing a procedure of selecting a region of interest by means of a second electronic device of FIG. 16.

FIG. 17 is a schematic diagram for describing a procedure of selecting a region of interest by means of a second electronic device of FIG. 16. To help better understanding, FIG. 16 will be referred together with FIG. 17.

Referring to FIG. 17, an outline of a display region DR1 that is selected in advance may be denoted by a bold dotted circle. As described with reference to FIG. 16, when a user provides the user input U_IN including information about a region of interest through the user interface 1270, the communication circuit 1210 may output the information signal FS including the information about the region of interest.

The display region DR1 that is set in advance may be changed to a display region DR2 corresponding to the region of interest, in response to the information signal FS. Referring to FIG. 17, an outline of the display region DR2 is denoted by an uneven dot-dash broken line. Based on the information signal FS, at least one of a location or a size of the region of interest may be changed.

For example, the user may operate a button or a knob or may tilt the second electronic device 1200*d* to adjust the location of the region of interest. For example, the user may touch the touch screen to adjust the size of the region of interest. These examples are just provided to help better understanding, and the present disclosure is not limited thereto. The interface to adjust the location and/or the size of the region of interest may be variously changed or modified.

When the display region DR2 is selected in response to the user request, the region determiner 1111 of FIG. 8 may determine a first region corresponding to the display region DR2 and a second region other than the first region. The video encoder 1113 of FIG. 8 may differently encode first image data corresponding to the first region and second image data corresponding to the second region. The display device 1250 may display the output image OI corresponding to the display region DR2.

Figure 18:
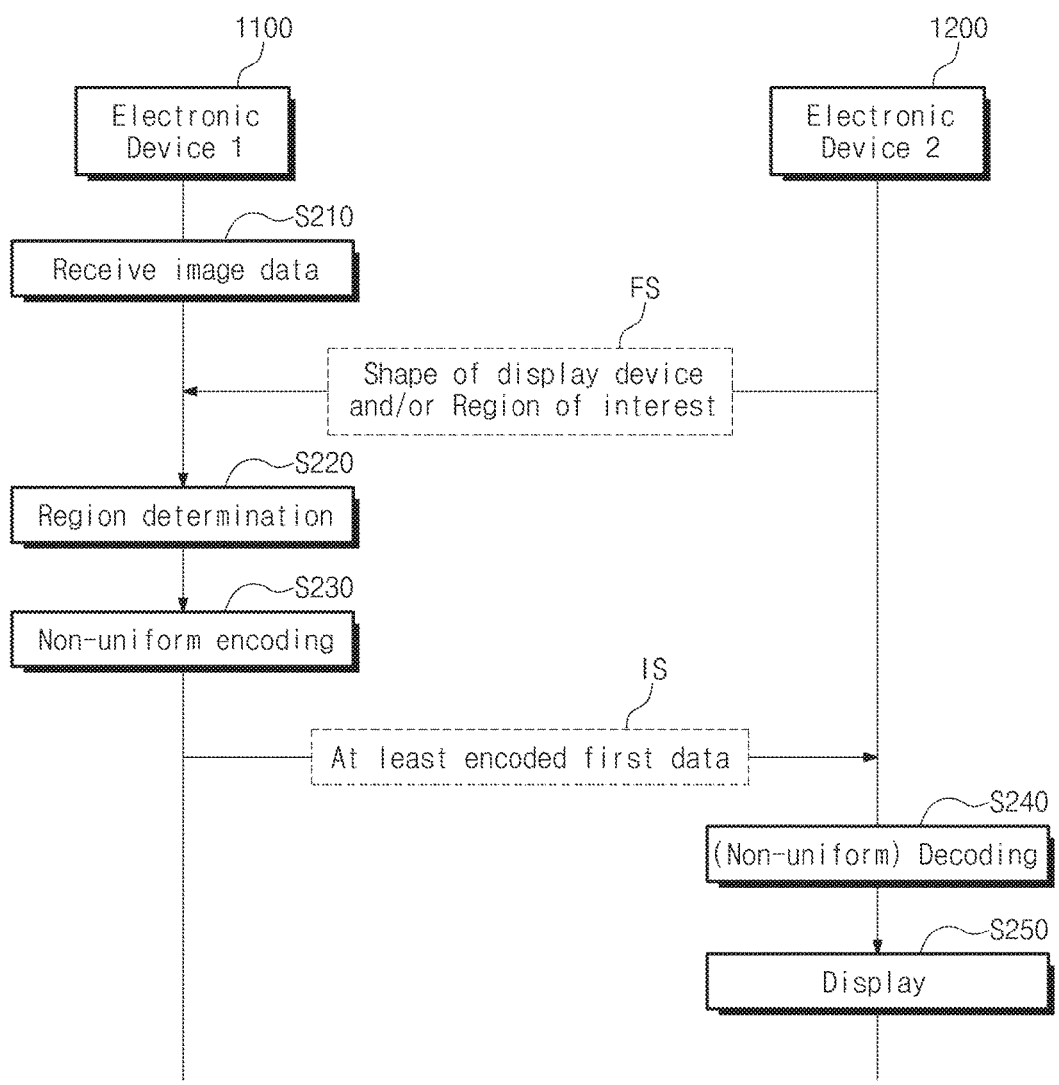
FIG. 18 is a flowchart describing operations of a first electronic device and a second electronic device of FIG. 1 or FIG. 8.

FIG. 18 is a flowchart describing operations of a first electronic device and a second electronic device of FIG. 1 or FIG. 8. The reference numerals and the sequence of operations illustrated in FIG. 18 are just examples, and the present disclosure is not limited thereto. The example embodiments may be changed or modified differently from those shown in FIG. 18.

In operation S210, the first electronic device 1100 may obtain image data. The second electronic device 1200 may transmit, for example, before or after operation S210, the information signal FS to the first electronic device 1100. The information signal FS may include information associated with a shape of a display device of the second electronic device 1200. In some example embodiments, the information signal FS may include information associated with a region of interest.

In operation S220, the first electronic device 1100 may determine a first region and a second region. The first and second regions may be determined depending on the shape of the display device of the second electronic device 1200. When the information signal FS includes information associated with the region of interest, a location and/or a size of the first region may be determined to correspond to the region of interest.

In operation S230, the first electronic device 1100 may differently encode first image data corresponding to the first region and second image data corresponding to the second region (referred to as the "non-uniform" encoding). After completing or while performing the encoding operation, the first electronic device 1100 may transmit the image signal IS to the second electronic device 1200. The image signal IS may include at least the encoded first image data, which will be used to display the output image on the display device of the second electronic device 1200.

In operation S240, the second electronic device 1200 may decode image data included in the image signal IS. For example, the image data included in the image signal IS may be decoded non-uniformly (refer to FIG. 15). In operation S250, the second electronic device 1200 may display the output image on the display device based on the decoded first image data. The output image may be displayed to fit into the shape of the display device.

In the example embodiments, to transmit the information signal FS and the image signal IS, some new communication protocol(s) may be defined between the first electronic device 1100 and the second electronic device 1200. In compliance with the new communication protocol(s), the first electronic device 1100 may differently operate according to the shape of the display device of the second electronic device 1200, and the second electronic device 1200 may understand the image signal IS transmitted from the first electronic device 1100.

Figure 19:
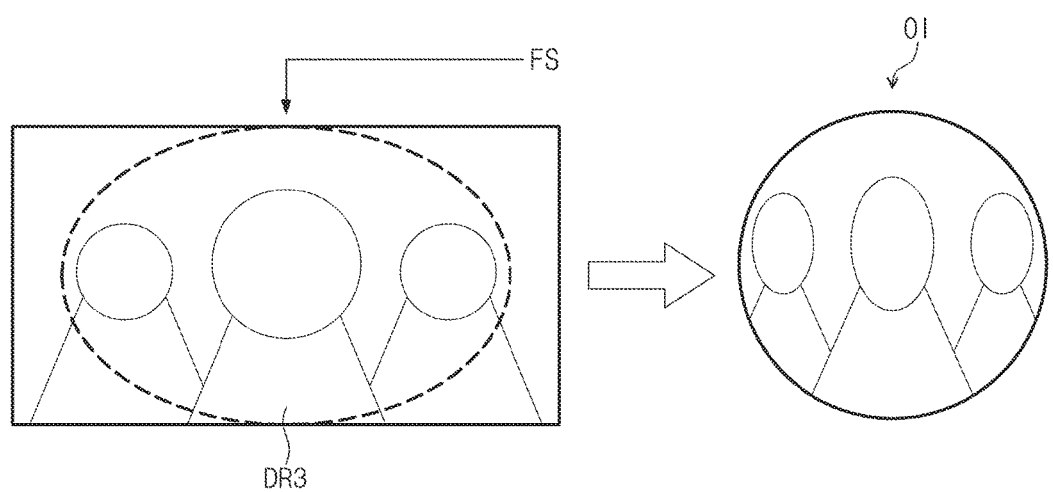
FIG. 19 is a schematic diagram for describing a procedure of selecting region of interest by means of a second electronic device of FIG. 16.

FIG. 19 is a schematic diagram for describing a procedure of selecting a region of interest by means of a second electronic device of FIG. 16. To help better understanding, FIG. 16 will be referred together with FIG. 19.

According to the example embodiments described with reference to FIG. 17, a shape of a region of interest may be the same as a shape of the display device 1250 of the second electronic device 1200d. A user of the second electronic device 1200d may select the region of interest to fit into the shape of the display device 1250.

In some example embodiments, the shape of the region of interest may be different from the shape of the display device 1250. For example, referring to FIG. 19, a shape of a display region DR3 determined to correspond to the region of interest may be different from the shape of the display device 1250 (for example, while the shape of the display device 1250 is circular, the shape of the display region DR3 is oval).

For example, the user may select the region of interest that has the shape different from the shape of the display device 1250, through the user interface 1270. The information signal FS may include information associated with the shape (and/or the size) of the selected region of interest. Based on the information signal FS, the display region DR3 that has the shape different from the shape of the display device 1250 may be determined. The first region and the second region may be divided based on the determined display region DR3.

In such an example embodiment, the output image OI displayed on the display device 1250 may include an entire image corresponding to the region of interest. However, because the shape of the display device 1250 is fixed, the output image OI may be slightly distorted (e.g., twisted, compressed, or spread). Even though the output image OI is distorted, the display device 1250 may provide more information to the user than conventional technologies. Accordingly, the inconvenience due to limitations in the shape of the display device 1250 may be relieved.

Figure 20:
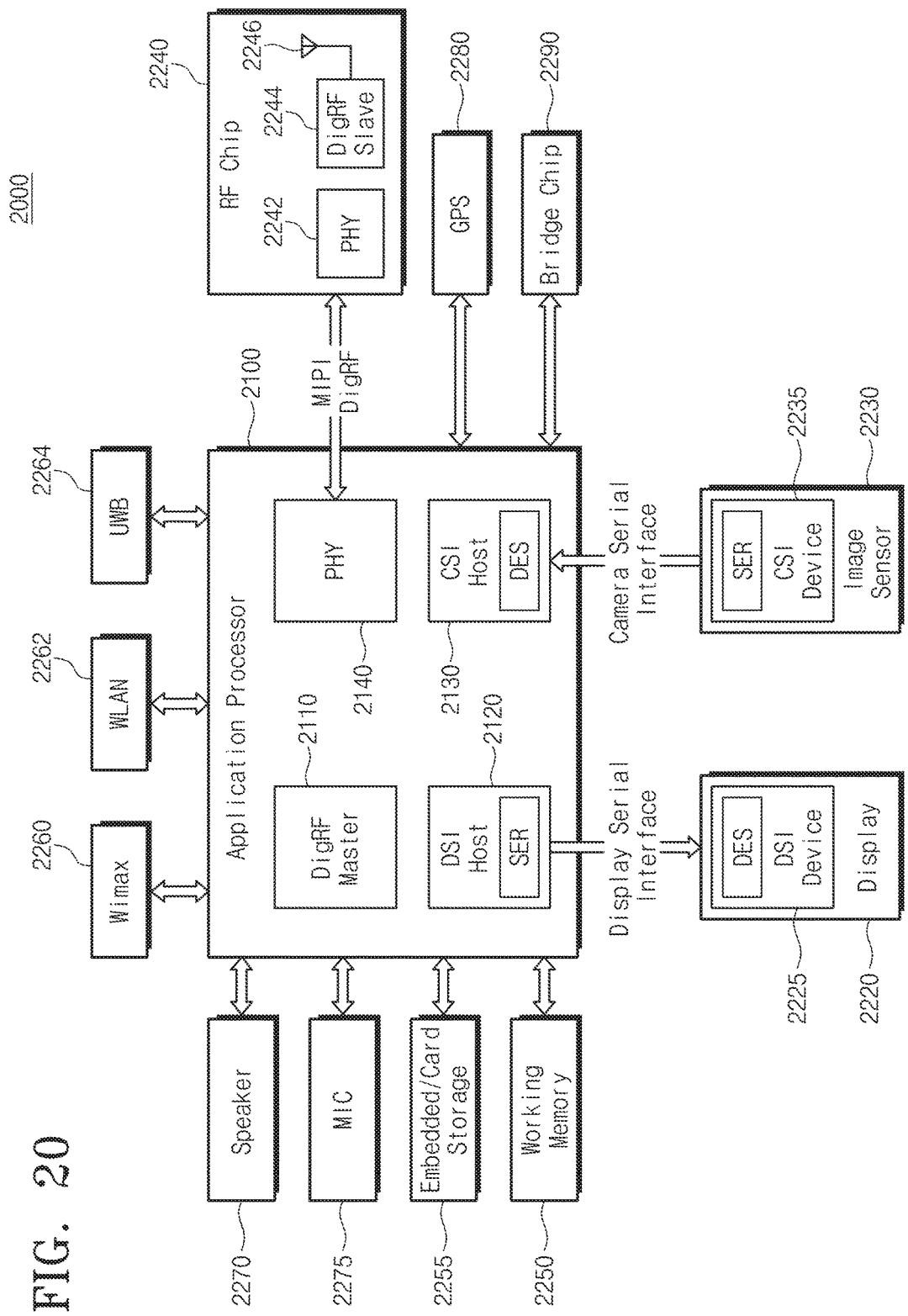
FIG. 20 is a block diagram illustrating a configuration of an electronic system including an operation processor and a display according to some example embodiments.

FIG. 20 is a block diagram illustrating a configuration of an electronic system including an operation processor and a display according to some example embodiments. An electronic system 2000 may be implemented with a data processing device capable of using or supporting an interface proposed by mobile industry processor interface (MIPI) alliance. For example, the electronic system 2000 may be implemented with one of various electronic devices, such as a digital camera, a video camcorder, a smart phone, a tablet, a wearable device (e.g., a smart watch, a smart band, or the like), and the like.

The electronic system 2000 may include an application processor 2100, a display 2220, and an image sensor 2230. The application processor 2100 may include a DigRF master 2110, a display serial interface (DSI) host 2120, a camera serial interface (CSI) host 2130, and a physical layer 2140.

The DSI host 2120 may communicate with a DSI device 2225 of the display 2220 in compliance with DSI. For example, an optical serializer SER may be implemented in the DSI host 2120, and an optical deserializer DES may be implemented in the DSI device 2225.

The CSI host 2130 may communicate with a CSI device 2235 of the image sensor 2230 in compliance with CSI. For example, an optical deserializer DES may be implemented in the CSI host 2130, and an optical serializer SER may be implemented in the CSI device 2235.

For example, when the electronic system 2000 is implemented with an electronic device that is capable of capturing an image (e.g., a digital camera or a video camcorder), the image sensor 2230 may capture an object and may generate image data (refer to FIG. 2). For example, when the electronic system 2000 is implemented with an electronic device that includes the display 2220 having non-rectangular shape (e.g., a smart watch or a smart band), the display 2220 may display an image selected to fit into the shape of the display 2220.

For example, the application processor 2100 may be provided as the operation processor 1110 or 1230 of FIG. 1. The application processor 2100 may be implemented to include at least one of the region determiner 1111, the video encoder 1113, or the video decoder 1233. The application processor 2100 may "non-uniformly" encode image data depending on a shape of a display device of an external device, or may "non-uniformly" decode image data depending on the shape of the display 2220.

The electronic system 2000 may further include a radio frequency (RF) chip 2240 for communicating with the application processor 2100. The RF chip 2240 may include a physical layer 2242, a DigRF slave 2244, and an antenna 2246. For example, the physical layer 2242 of the RF chip 2240 and the physical layer 2140 of the application processor 2100 may exchange data with each other in compliance with DigRF interface proposed by MIPI alliance.

The electronic system 2000 may further include a working memory 2250 and an embedded/card storage 2255. The working memory 2250 and the embedded/card storage 2255 may store data received from the application processor 2100. Moreover, the working memory 2250 and the embedded/card storage 2255 may provide the data stored therein to the application processor 2100. For example, the working memory 2250 and/or the embedded/card storage 2255 may store image data according to the example embodiments.

The working memory 2250 may temporarily store data processed or to be processed by the application processor 2100. The working memory 2250 may include a volatile memory, such as a static random access memory (SRAM), a dynamic RAM (DRAM), a synchronous DRAM (SDRAM), or the like, and/or a nonvolatile memory, such as a flash memory, a phase-change RAM (PRAM), a magneto-resistive RAM (MRAM), a resistive RAM (ReRAM), a ferro-electric RAM (FRAM), or the like.

The embedded/card storage 2255 may store data regardless of power supply. The embedded/card storage 2255 may include one or more nonvolatile memories, a memory controller, and a buffer. For example, the embedded/card storage 2255 may include at least one of nonvolatile memories, such as a flash memory, PRAM, MRAM, ReRAM, FRAM, and/or the like. For example, the embedded/card storage 2255 may be devices such as secure digital (SD) card, embedded multimedia card (eMMC), and/or the like.

The electronic system 2000 may communicate with an external system through a communication module, such as worldwide interoperability for microwave access (WiMAX) 2260, wireless local area network (WLAN) 2262, ultra-wideband (IJWB) 2264, and/or the like. Even though the WiMAX 2260, the WLAN 2262 and the UWB 2264 are mentioned to help better understanding, the electronic system 2000 may further include other various communication modules. The communication modules of the electronic system 2000 may transmit/receive an information signal and an image signal according to the example embodiments.

The electronic system 2000 may further include a speaker 2270 and a microphone 2275 for processing voice information. The electronic system 2000 may further include a global positioning system (GPS) device 2280 for processing position information. The electronic system 2000 may further include a bridge chip 2290 for managing connections with peripheral devices.

According to the example embodiments, even though a shape of an image represented by image data is different from a shape of a display device, the image may be displayed on the display device while minimizing a strange feeling. Furthermore, according to the example embodiments, speed and efficiency of the image processing and the image data transmission may be improved.

Circuits, chips, and devices according to the example embodiments of the present disclosure may be mounted using various kinds of semiconductor packages. For example, circuits, chips, and devices according to the example embodiments may be mounted using a package such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP), and/or wafer-level processed stack package (WSP).

The configurations shown in the conceptual diagrams are illustrative of the present disclosure. To help better understanding of the present disclosure, forms, structures, and sizes of each component shown in each conceptual diagram have been exaggerated or reduced. Configurations actually implemented may have a different physical shape from that shown in each conceptual diagram. Each conceptual diagram is not intended to limit the physical shape of the components.

The device configurations shown in the block diagrams are provided to help better understanding of the present disclosure. Each of the block may be formed of smaller blocks according to functions. Alternatively, a plurality of blocks may form a larger block according to a function. That is, the spirit or the scope of the present disclosure is not limited to the configuration shown in a block diagram.

Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An electronic device comprising:
an operation processor configured to encode image data, the image data generated by capturing an object, the operation processor further configured to,
divide an image represented by the image data into a first region and a second region based on an information signal received from an external device, the information signal including information associated with a shape of a display region of the external device such that an outline of the first region varies depending on the shape of the display region,
encode first image data corresponding to the first region by a first encoding manner, and
encode second image data corresponding to the second region by a second encoding manner, the second encoding manner being different from the first encoding manner; and
a communication circuit configured to receive the information signal from the external device and provide the information signal to the operation processor,
wherein the first region includes a third region and a fourth region, the third region being entirely inside an outline of a display region that corresponds to an image to be displayed on the display region of the external device, the fourth region overlapping the outline of the display region, and
the operation processor is further configured to encode the first image data by encoding third image data corresponding to the third region and fourth image data corresponding to at least a portion of the fourth region by the first encoding manner, the third region encoded by a unit of processing block, and the fourth region encoded by a unit of sub block, the processing block divided into a plurality of sub blocks.

2. The electronic device of claim 1, wherein a shape of the image represented by the image data is different from the shape of the display region of the external device.

3. The electronic device of claim 1, wherein the operation processor is further configured to determine the first region to correspond to a middle area of the image represented by the image data.

4. The electronic device of claim 1, wherein
the operation processor is further configured to determine the first region to include image data associated with a target of interest of the object, and
the operation processor is further configured to determine the target of interest based on at least one result of a facial recognition for the object or tracing of a voice generated by the object.

5. The electronic device of claim 1, wherein
the information signal further includes information associated with a region of interest to be displayed on the display region of the external device, and
the operation processor is further configured to determine the first region to correspond to the region of interest.

6. The electronic device of claim 5, wherein a shape of the first region determined to correspond to the region of interest is different from the shape of the display region of the external device.

7. The electronic device of claim 1, wherein the first encoding manner has an encoding characteristic of higher quality than the second encoding manner.

8. The electronic device of claim 1, wherein
the communication circuit is further configured to output an information signal including the encoded first image data to the external device, and
the external device is configured to display an entirety or a portion of an image represented by the first image data—and not display an image represented by the second image data on the display region the external device.

9. An electronic device comprising:
an image sensor configured to generate an image signal of an object;
a memory having computer-readable instructions stored therein; and
at least one processor configured to execute the computer-readable instructions to cause the electronic device to, generate, by processing the image signal, an image represented by image data in the image signal, divide the image represented by the image data into two or more regions including at least a first region, a second region, and a third region, the first region being a region inside or overlapping with a boundary, the second region being a region outside the boundary and adjacent to the first region, the boundary determined based on a shape of a display region of an external device, the third region not overlapping the first and second regions, the image represented by the image data being a plurality of processing blocks, encode, on a processing block basis, first image data corresponding to the first region predominantly by a first encoding manner and second image data corresponding to the second region by a second encoding manner, the second encoding manner having lower resolution than the first encoding manner, and output an image data signal to the external device, the image data signal including at least the encoded first image data and not including information associated with the third region such that an image corresponding to the third region is not displayed on the display region of the external device.

10. The electronic device of claim 9, wherein the at least one processor is further configured to execute the computer-readable instructions to cause the electronic device to change, based on an information signal from the external device or a user, at least one of a location or a size of the first region.

11. The electronic device of claim 9, wherein the at least one processor is further configured to execute the computer-readable instructions to cause the electronic device to not encode the third image data.

* * * * *